US009873295B2

(12) United States Patent
Tsiberidis

(10) Patent No.: US 9,873,295 B2
(45) Date of Patent: Jan. 23, 2018

(54) VEHICLE AXLE ASSEMBLY WITH INTEGRATED PRESSURIZING MEDIUM LINE FOR FILLING THE TIRES

(71) Applicant: GV ENGINEERING GMBH, Heimsheim (DE)

(72) Inventor: Konstantinos Tsiberidis, Heilbronn (DE)

(73) Assignee: GV ENGINEERING GMBH, Heimsheim (DE)

( * ) Notice: Subject to any disclaimer, the term of this patent is extended or adjusted under 35 U.S.C. 154(b) by 0 days.

(21) Appl. No.: 15/116,627

(22) PCT Filed: Feb. 4, 2015

(86) PCT No.: PCT/EP2015/052302
§ 371 (c)(1),
(2) Date: Aug. 4, 2016

(87) PCT Pub. No.: WO2015/118013
PCT Pub. Date: Aug. 13, 2015

(65) Prior Publication Data
US 2016/0347131 A1    Dec. 1, 2016

(30) Foreign Application Priority Data

Feb. 4, 2014   (DE) .................. 10 2014 001 373

(51) Int. Cl.
*B60C 23/00*     (2006.01)
*B60B 7/00*      (2006.01)
(Continued)

(52) U.S. Cl.
CPC .......... *B60C 23/003* (2013.01); *B60B 7/0013* (2013.01); *B60B 19/08* (2013.01);
(Continued)

(58) Field of Classification Search
CPC ........ B60C 23/003; F16C 33/78; F16C 33/76; F16C 33/768; F16C 33/7803;
(Continued)

(56) References Cited

U.S. PATENT DOCUMENTS 4,733,707 A * 3/1988 Goodell ................ B60C 23/003
                                                      137/224
5,080,157 A * 1/1992 Oerter ..................... B25B 23/08
                                                      152/417
(Continued)

FOREIGN PATENT DOCUMENTS

DE          690 00 187 T2     2/1993
DE         102013017879 A1    4/2015
(Continued)

OTHER PUBLICATIONS

International Search Report for International Application No. PCT/EP2015/052302 dated May 20, 2015.

*Primary Examiner* — Jason R Bellinger
(74) *Attorney, Agent, or Firm* — Carter, DeLuca, Farrell & Schmidt, LLP

(57) ABSTRACT

A vehicle axle assembly is provided having a hub which is mounted on a cylindrical axle body by way of a ball bearing so as to be rotatable about a central longitudinal axis, wherein the ball bearing has an inner race connected to the axle body and has an outer race connected to the hub. The vehicle axle assembly includes an axially inner shaft sealing ring and an axially outer shaft sealing ring which are sealingly arranged between the two races and which delimit a ring-shaped chamber between the two races a first pressure medium line which extends through the inner race or one of the two shaft sealing rings and which opens into the ring-shaped chamber; and a second pressure medium line which extends from the ring-shaped chamber through the outer
(Continued)

race and which is configured to be connected to a wheel fastened on the hub.

27 Claims, 14 Drawing Sheets

(51) Int. Cl.
| | |
|---|---|
| *B60B 19/08* | (2006.01) |
| *B60B 27/00* | (2006.01) |
| *F16C 33/76* | (2006.01) |
| *F16C 41/00* | (2006.01) |
| *F16J 15/00* | (2006.01) |
| *F16J 15/3236* | (2016.01) |
| *B60B 27/02* | (2006.01) |
| *B60B 35/02* | (2006.01) |
| *F16C 33/72* | (2006.01) |

(52) U.S. Cl.
CPC ...... *B60B 27/0005* (2013.01); *B60B 27/0073* (2013.01); *B60B 27/0078* (2013.01); *B60B 27/02* (2013.01); *B60B 35/02* (2013.01); *F16C 33/726* (2013.01); *F16C 33/76* (2013.01); *F16C 41/005* (2013.01); *F16J 15/002* (2013.01); *F16J 15/3236* (2013.01); *B60B 27/001* (2013.01)

(58) Field of Classification Search
CPC ............. F16C 33/7806; F16C 33/7813; F16C 33/7816; F16C 33/7823; F16C 33/80
See application file for complete search history.

(56) References Cited

U.S. PATENT DOCUMENTS

| | | | | |
|---|---|---|---|---|
| 5,174,839 | A * | 12/1992 | Schultz | B60C 23/003 |
| | | | | 152/415 |
| 5,642,946 | A | 7/1997 | Caillault et al. | |
| 6,199,611 | B1 * | 3/2001 | Wernick | B60C 23/003 |
| | | | | 152/417 |
| 6,315,457 | B1 * | 11/2001 | Kapaan | B60B 27/001 |
| | | | | 384/506 |
| 6,976,789 | B2 * | 12/2005 | Pilone | B60C 23/003 |
| | | | | 152/417 |
| 7,168,468 | B2 * | 1/2007 | Wang | B60C 23/003 |
| | | | | 152/427 |
| 7,625,127 | B2 * | 12/2009 | Foti | B60C 23/003 |
| | | | | 152/417 |
| 7,896,045 | B2 * | 3/2011 | Solie | B60C 23/003 |
| | | | | 152/416 |
| 7,931,061 | B2 * | 4/2011 | Gonska | B60C 23/003 |
| | | | | 152/417 |
| 7,997,316 | B2 * | 8/2011 | Walter | B60C 23/003 |
| | | | | 152/417 |
| 2005/0052074 | A1 | 3/2005 | Hennig et al. | |

FOREIGN PATENT DOCUMENTS

| | | |
|---|---|---|
| EP | 0379355 A1 | 7/1990 |
| WO | 2007/090361 A1 | 8/2007 |
| WO | 2014/063873 A2 | 5/2014 |

\* cited by examiner

VEHICLE AXLE ASSEMBLY WITH INTEGRATED PRESSURIZING MEDIUM LINE FOR FILLING THE TIRES

CROSS REFERENCE TO RELATED APPLICATIONS

This application is a national stage application of International Application No. PCT/EP2015/052302, filed on Feb. 4, 2015, which claims the benefit of and priority to German Patent Application No. 10 2014 001 373.1, filed on Feb. 4, 2014, the entire contents of each of which are hereby incorporated by reference herein in their entireties.

TECHNICAL FIELD

The present invention relates generally to the field of vehicles with pneumatic tires, and in particular to a vehicle axle assembly having an integrated pressure medium line for the supply of a pressure medium into a tire.

BACKGROUND

For the filling of a vehicle tire with a pressure medium, generally compressed air, it is known to provide on the vehicle wheel a valve by way of which the pressure medium can be introduced into the tire. In the case of cars, trucks, utility vehicles or even trailers, such valves are normally arranged in the region of a wheel rim, on which the tire is mounted, so as to be easily accessible to a person seeking to perform the filling of the tire. Typically, here, a pressure medium source external to the vehicle is connected to the valve of the tire, normally by way of a hose line, for the purposes of thereby being able to check and, if appropriate, correct the tire pressure.

This method for tire pressure regulation basically has the disadvantage that regulation can be performed only at locations at which a pressure medium source is available, for example at refueling stations, because coupling to a pressure medium source external to the vehicle is necessary in each case. It would basically be desirable for tire pressure regulation to be able to be performed autonomously, for example for the purposes of quickly adapting the tire pressure, during long-distance travel, to changed load conditions, road surfaces and ambient temperatures.

It is therefore an object of the invention to provide a solution for effecting a supply of pressure medium into and discharge of pressure medium from a vehicle tire autonomously and preferably also during travel.

SUMMARY

According to one aspect, said object is achieved on the basis of a first vehicle axle assembly having a hub which is mounted on a cylindrical axle body by way of a ball bearing so as to be rotatable about a central longitudinal axis, wherein the ball bearing has an inner race connected to the axle body and has an outer race connected to the hub.

According to a first variant, the first vehicle axle assembly has an axially inner shaft sealing ring and an axially outer shaft sealing ring which are sealingly arranged between the two races and which delimit a ring-shaped chamber between the two races, a first pressure medium line which extends through the inner race or one of the two shaft sealing rings and which opens into the ring-shaped chamber, and a second pressure medium line which extends from the ring-shaped chamber through the outer race and which is configured to be connected to a wheel fastened on the hub.

Such an arrangement has the advantage that a supply of pressure medium from a part fixed relative to the vehicle, specifically the axle body, into the hub that rotates relative to the axle body, and thus into the wheel that rotates relative to the axle body, is possible. This is achieved in that, between the two shaft sealing rings, there is provided a ring-shaped chamber which produces a coupling suitable for conducting pressure medium between the fixed body and the rotating wheel. The axially inner shaft sealing ring and the axially outer shaft sealing ring are in this case arranged with an axial spacing to one another such that a substantially hollow cylindrical chamber provided between the two races is utilized for forming the ring-shaped chamber. The ring-shaped chamber is delimited by the inner shell surface of the outer race, the outer shell surface of the inner race and the two shaft sealing rings. The two shaft sealing rings are preferably arranged between the two races in the region of an axial end of the ball bearing, such that said shaft sealing rings form an outer skin, which imparts a sealing action between the two races, for the ball bearing, which outer skin prevents an ingress of dust and dirt particles into the ball bearing and prevents an escape of lubricants from the ball bearing.

The first pressure medium line is provided for conducting a pressure medium, such as for example compressed air, into the ring-shaped chamber from a pressure medium source located on board the vehicle. The pressure medium source may for example be a compressor or a pressure medium vessel in which there is stored, for example, compressed air. The first pressure medium line is fixed relative to the axle body. Said first pressure medium line may run outside the axle body and fastened thereto by way of suitable brackets. If the first pressure medium line runs outside the axle body, it may preferably extend axially through one of the two shaft sealing rings in order to open into the ring-shaped chamber. It is likewise possible for the first pressure medium line to run at least in sections through the axle body, for example through a bore formed in the axle body. From there, the first pressure medium line may run through the inner race, for example through a bore formed in the inner race, in order to open into the ring-shaped chamber.

The second pressure medium line serves for conducting the pressure medium onward out of the ring-shaped chamber and is, at its end remote from the chamber, configured to be connected to a wheel fastened to the hub. A wheel of said type may comprise a wheel rim and a tire mounted on the wheel rim, with a valve for the connection of the second pressure medium line. The second pressure medium line can thus run to the valve and connected thereto, such that the supply of pressure medium into the tire can be performed.

In a second variant, the first vehicle axle assembly has a shaft sealing ring with at least two radially extending circumferential sealing lips, which shaft sealing ring is sealingly arranged between the two races and delimits a ring-shaped chamber between the circumferential sealing lips and one of the two races, a first pressure medium line which extends through the inner race and/or the shaft sealing ring and which opens into the ring-shaped chamber; and a second pressure medium line which extends from the ring-shaped chamber through the shaft sealing ring and/or the outer race and which is configured to be connected to a wheel fastened on the hub.

The second variant differs from the first variant of the first vehicle axle assembly in that the coupling, which is suitable for conducting pressure medium, between the two races of the ball bearing is realized not by way of two axially mutually spaced-apart shaft sealing rings but by way of a single shaft sealing ring.

A shaft sealing ring of said type generally has a ring-shaped main body, one shell surface of which forms a sealing surface running in a circumferential direction, and from the opposite, other shell surface of which at least two circumferential sealing lips extend radially, between which circumferential sealing lips there is delimited an outer cavity which is open toward the outside. The shaft sealing ring has a pressure medium inlet in an outer wall of the main body and has a pressure medium outlet which opens into the outer cavity and which is fluidically connected to the inlet. If a shaft sealing ring of said type is sealingly arranged between the two races of the ball bearing, the outer cavity, delimited between the two circumferential sealing lips, of the shaft sealing ring is additionally delimited by a shell surface of the race which is in contact with the circumferential sealing lips, such that the ring-shaped chamber is formed.

If the circumferential sealing lips of the shaft sealing ring are formed on the outer shell surface of said shaft sealing ring, the ring-shaped chamber is delimited between the outer shell surface of the shaft sealing ring, the circumferential sealing lips and the inner shell surface of the outer race. In this case, the first pressure medium line extends through the shaft sealing ring into the ring-shaped chamber. For this purpose, the first pressure medium line runs to the pressure medium inlet that is provided in the outer wall of the main body of the shaft sealing ring, and is connected to said pressure medium inlet in pressure-tight fashion. The second pressure medium line extends from the ring-shaped chamber through the outer race.

If the circumferential sealing lips of the shaft sealing ring are formed on the inner shell surface of said shaft sealing ring, the ring-shaped chamber is delimited between the inner shell surface of the shaft sealing ring, the circumferential sealing lips and the outer shell surface of the inner race. In this case, the first pressure medium line extends through the inner race in order to open into the ring-shaped chamber. The second pressure medium line extends from the ring-shaped chamber through the shaft sealing ring, specifically by the pressure medium outlet, towards and up to the pressure medium inlet provided in an outer wall of the main body of the shaft sealing ring, from which pressure medium inlet said second pressure medium line extends through the outer race.

In a third variant, the first vehicle axle assembly has a ring-shaped profile of U-shaped cross section which is connected to an inner shell surface of the outer race and the side walls of which run axially or radially, a sealing ring which is arranged between the side walls and which is non-rotatable with respect to the inner race and which delimits a ring-shaped chamber in the ring-shaped profile, a first pressure medium line which extends through the sealing ring and which opens into the ring-shaped chamber; and a second pressure medium line which extends from the ring-shaped chamber through the ring-shaped profile and the outer race and which is configured to be connected to a wheel fastened on the hub.

The third variant differs from the first and second variants of the first vehicle axle assembly in that the coupling, which is suitable for conducting pressure medium, between the two races of the ball bearing is formed in a different way. Instead of producing the coupling by way of one or two shaft sealing rings, it is the case in this variant that a ring-shaped profile is used which is connected to the inner shell surface of the outer race and between the side walls of which a sealing ring is sealingly arranged.

In this variant, the ring-shaped chamber is delimited between the inner surfaces of the walls of the U-shaped ring-shaped profile and the sealing ring. The first pressure medium line extends through the sealing ring in order to open into the ring-shaped chamber, and the second pressure medium line extends from the ring-shaped chamber through one of the walls of the ring-shaped profile and subsequently through the outer race.

Below, reference will now be made to features which describe particular embodiments of the second pressure medium line and which are applicable equally to the first, second and third variants of the first vehicle axle assembly.

In one embodiment, the hub comprises a flange for the fastening of the wheel, which flange is fastened to the outer race of the ball bearing. The second pressure medium line may then extend through the outer race and the flange towards and up to a pressure medium line connector provided on the flange. The second pressure medium line then runs in the interior of the outer race and of the flange and may be realized for example by way of a bore formed in the outer race or in the flange. It is also conceivable for the outer race and/or the flange to be produced as a casting with a correspondingly formed line.

The flange may bear in a planar fashion by way of an axial inner side against an axial outer side of the outer race and be held on the outer race by suitable fastening means. At the transition between the outer race and the flange, there may be provided a seal arrangement which ensures that the transition of the second pressure medium line between the two components is pressure-tight. It is for example conceivable for there to be provided at the transition a recess with, arranged therein, a seal ring, for example an O-ring, which is thicker than the recess is deep, such that the seal ring is compressed in the recess during the installation of the flange on the outer race, and thus a pressure-tight transition for the second pressure medium line between the flange and the outer race is provided.

The pressure medium line connector to which the second pressure medium line extends through the flange may be provided on an axial outer side of the flange. From a pressure medium line connector of said type, the second pressure medium line may run axially outside the flange in a substantially radial direction to a valve of the wheel that is fastened on the flange of the hub. Alternatively, the pressure medium line connector may also be provided on an outer circumferential surface of the flange. The second pressure medium line is advantageously then led towards and up to a radially outermost outer circumferential surface of the flange, such that only a relatively short pressure medium line piece is necessary in order to extend the second pressure medium line from the pressure medium line connector to the valve on the wheel.

In an embodiment in which the hub has a flange for the fastening of the wheel, it may also be provided that the outer race comprises a bore for receiving a pressure medium line screw, wherein the pressure medium line screw serves for the fastening of the flange to the outer race. The second pressure medium line may then extend through the outer race into the bore and subsequently run through the pressure medium line screw towards and up to a pressure medium line connector which is provided on the head of the screw. The second pressure medium line may in this case be in the form of a bore formed from the tip of the screw to the head of the screw.

The second pressure medium line advantageously opens into a base of the bore. The length of the pressure medium line screw may be dimensioned such that the tip of the screw does not extend until the base of the bore, such that a cavity is formed in the region of the base of the bore. A cavity of said type may serve as a coupling chamber between the pressure medium line screw and that section of the second pressure medium line which extends to the base of the bore. Pressure-tight sealing of said cavity may be ensured already by way of the form fit between the thread of the screw and the thread, which interacts therewith, of the bore. To ensure a complete seal, it is also possible for a seal ring, for example an O-ring, to be arranged between the head of the screw and the flange.

In a refinement of an embodiment of said type, the flange may be connected to the outer race by way of multiple screws, and the bore in which the pressure medium line screw is received may be connected in fluid-conducting fashion to bores in which the other screws which serve for fastening purposes are received. A fluid-conducting connection between the individual bores may be realized for example by way of a ring-shaped duct formed in the outer race of the ball bearing, which ring-shaped duct connects the individual cavities of the bores to one another. The ring-shaped duct may in turn be realized by bores formed in the outer race.

To lead the second pressure medium line from a pressure medium connector provided on the flange or on the pressure medium line screw to a valve on the wheel, the second pressure medium line may be, from the pressure medium line connector towards and up to the connection to the valve on the wheel, in the form of a pipeline or hose line. The pressure medium line connector itself may advantageously exhibit a closure mechanism which is easy for a user to handle, for example with a detent engagement function.

In a refinement in which the hub has a flange for the fastening of the wheel and in which the flange is fastened to the outer race, the second pressure medium line may also extend through the outer race, or along an outer shell surface thereof, towards and up to the flange and then extend along an axial inner side of the flange towards and up to an outer circumferential surface of the flange. On the outer circumferential surface of the flange, the second pressure medium line can run onward, without interruption, to the connection to the valve on the wheel. It is however self-evident that, here, it is also possible for a pressure medium line connector to be provided on the outer circumferential surface of the flange, from which pressure medium line connector the pressure medium line can run onward to the valve on the wheel.

In a refinement, a recess may be formed along the outer shell surface of the outer race and/or along the axial inner side of the flange, and the second pressure medium line may be arranged in the recess. Such a recess can facilitate the locating of the second pressure medium line on the axial inner side of the flange. The second pressure medium line may in this case be entirely or only partially sunk into the recess.

According to a further aspect, the object mentioned in the introduction is achieved on the basis of a second vehicle axle assembly having a hub which is mounted on a cylindrical axle body so as to be rotatable about a central longitudinal axis and which comprises a cover which covers an axial end of the axle body.

According to a first variant, the second vehicle axle assembly has a cylindrical projection which is formed on an axial inner side of the cover and which axially overlaps a cylindrical end section of the axle body, an axially inner shaft sealing ring and an axially outer shaft sealing ring which are sealingly arranged between the projection and the end section and which delimit a ring-shaped chamber between the projection and the end section, a first pressure medium line which extends through the end section or one of the two shaft sealing rings and which opens into the ring-shaped chamber; and a second pressure medium line which extends from the ring-shaped chamber through the projection and which is configured to be connected to a wheel fastened on the hub.

The projection of the cover may in this case have a hollow cylindrical shape which surrounds the cylindrical end section in the region of the axial overlap. Conversely, it is also possible for the end section of the axle body to have a hollow cylindrical shape which surrounds the cylindrical projection in the region of the axial overlap.

Such an arrangement has the advantage that a supply of pressure medium from a part fixed relative to the vehicle, specifically the axle body, into the hub that rotates relative to the axle body, and thus into the wheel that rotates relative to the axle body, is possible. This is achieved in that, between the two shaft sealing rings, there is provided a ring-shaped chamber which produces a coupling, which is suitable for conducting pressure medium, between the fixed body and the rotating wheel. The axially inner shaft sealing ring and the axially outer shaft sealing ring are in this case arranged with an axial spacing to one another such that a substantially hollow cylindrical chamber provided between the projection and the end section is utilized for forming the ring-shaped chamber. If the projection surrounds the end section, the ring-shaped chamber is delimited by the inner shell surface of the projection, the outer shell surface of the end section and the two shaft sealing rings. If the end section surrounds the projection, the ring-shaped chamber is delimited by the inner shell surface of the end section, the outer shell surface of the projection and the two shaft sealing rings.

The first pressure medium line is provided for conducting a pressure medium, such as for example compressed air, into the ring-shaped chamber from a pressure medium source situated on board the vehicle. The pressure medium source may for example be a compressor or a pressure medium vessel in which there is stored, for example, compressed air. The first pressure medium line is fixed relative to the axle body. Said first pressure medium line may run outside the axle body and fastened thereto by way of suitable brackets. If the first pressure medium line runs outside the axle body, it may preferably extend axially through one of the two shaft sealing rings in order to open into the ring-shaped chamber. It is likewise possible for the first pressure medium line to run at least in sections through the axle body, for example through a bore formed in the axle body.

If the first pressure medium line extends through one of the two shaft sealing rings, said first pressure medium line may also, in an advantageous refinement, split into at least two sub-lines before it extends through the shaft sealing ring. In particular, the sub-lines may be arranged on the shaft sealing ring so as to be distributed uniformly in the circumferential direction thereof before opening individually into the ring-shaped chamber.

The second pressure medium line serves for conducting the pressure medium onward out of the ring-shaped chamber and is, at its end remote from the chamber, configured to be connected to a wheel fastened to the hub. A wheel of said type may comprise a wheel rim and a tire mounted on the wheel rim, with a valve for the connection of the second pressure medium line. The second pressure medium line can thus be led to the valve and connected thereto, such that the supply of pressure medium into the tire can be performed.

According to a second variant, the second vehicle axle assembly has a shaft sealing ring with at least two radially extending circumferential sealing lips, which shaft sealing ring is sealingly arranged between the projection and the end section and delimits a ring-shaped chamber between the circumferential sealing lips and the projection or the end section, a first pressure medium line which extends through the end section and/or or the shaft sealing ring and which opens into the ring-shaped chamber; and a second pressure medium line which extends from the ring-shaped chamber through the shaft sealing ring and/or the projection and which is configured to be connected to a wheel fastened on the hub.

The second variant differs from the first variant of the second vehicle axle assembly in that the coupling, which is suitable for conducting pressure medium, between the projection and the end section is realized not by way of two axially mutually spaced-apart shaft sealing rings but by way of a single shaft sealing ring.

A shaft sealing ring of said type generally has a ring-shaped main body, one shell surface of which forms a sealing surface running in a circumferential direction, and from the opposite, other shell surface of which at least two circumferential sealing lips extend radially, between which circumferential sealing lips there is delimited an outer cavity which is open toward the outside. The shaft sealing ring has a pressure medium inlet in an outer wall of the main body and has a pressure medium outlet which opens into the outer cavity and which is fluidically connected to the inlet. If a shaft sealing ring of said type is sealingly arranged between the projection and the end section, the outer cavity, delimited between the two circumferential sealing lips, of the shaft sealing ring is additionally delimited by a shell surface of the projection or end section which is in contact with the circumferential sealing lips, such that the ring-shaped chamber is formed.

If the circumferential sealing lips of the shaft sealing ring are formed on the outer shell surface of said shaft sealing ring, the ring-shaped chamber is delimited between the outer shell surface of the shaft sealing ring, the circumferential sealing lips and the inner shell surface of the projection or end section. In this case, the first pressure medium line extends through the shaft sealing ring into the ring-shaped chamber. For this purpose, the first pressure medium line runs to the pressure medium inlet that is provided in the outer wall of the main body of the shaft sealing ring, and is connected to said pressure medium inlet in pressure-tight fashion. The second pressure medium line extends from the ring-shaped chamber through the projection or end section.

If the circumferential sealing lips of the shaft sealing ring are formed on the inner shell surface of said shaft sealing ring, the ring-shaped chamber is delimited between the inner shell surface of the shaft sealing ring, the circumferential sealing lips and the outer shell surface of the end section or projection. In this case, the first pressure medium line extends through the end section or projection in order to open into the ring-shaped chamber. The second pressure medium line extends from the ring-shaped chamber through the shaft sealing ring, specifically by the pressure medium outlet, towards and up to the pressure medium inlet provided in an outer wall of the main body of the shaft sealing ring, from which pressure medium inlet said second pressure medium line extends through the projection or end section.

If the first pressure medium line extends through the shaft sealing ring, said first pressure medium line may, in an advantageous refinement, split into at least two sub-lines before it extends through the shaft sealing ring. In particular, the sub-lines may be arranged on the shaft sealing ring so as to be distributed uniformly in the circumferential direction thereof before opening individually into the ring-shaped chamber.

In a third variant, the second vehicle axle assembly has a ring-shaped profile of U-shaped cross section which is connected to an axial inner side of the cover and the side walls of which run axially or radially, a sealing ring which is arranged between the side walls and which is non-rotatable with respect to the axle body and which delimits a ring-shaped chamber in the ring-shaped profile, a first pressure medium line which extends through the sealing ring and which opens into the ring-shaped chamber, and a second pressure medium line which extends from the ring-shaped chamber through the ring-shaped profile and the cover and which is configured to be connected to a wheel fastened on the hub.

The third variant differs from the first and second variants of the second vehicle axle assembly in that the ring-shaped chamber which is suitable for conducting pressure medium is formed in a different way. Instead of producing the coupling by way of one or two shaft sealing rings, it is the case in this variant that a ring-shaped profile is used which is connected to the axial inner side of the cover and between the side walls of which a sealing ring is sealingly arranged.

Furthermore, the third variant differs from the first and second variants of the second vehicle axle assembly in that, on the axial inner side of the cover, there is not necessarily formed a cylindrical projection which axially overlaps a cylindrical end section of the axle body, although this is possible analogously to the first and second variants of the second vehicle axle assembly. In the latter case, the ring-shaped profile may be connected to a cylindrical projection formed on the axial inner side of the cover.

The ring-shaped chamber is delimited between the inner surfaces of the walls of the U-shaped ring-shaped profile and the sealing ring. The first pressure medium line extends through the sealing ring in order to open into the ring-shaped chamber, and the second pressure medium line extends from the ring-shaped chamber through one of the walls of the ring-shaped profile and subsequently through the cover.

If the first pressure medium line extends through the sealing ring, said first pressure medium line may, in an advantageous refinement, split into at least two sub-lines before it extends through the sealing ring. In particular, the sub-lines may be arranged on the sealing ring so as to be distributed uniformly in the circumferential direction thereof before opening individually into the ring-shaped chamber.

The ring-shaped profile connected to the cover may be formed as a separate part which is fastened to the cover or to the projection formed thereon. In an advantageous embodiment, the ring-shaped profile may also be formed integrally with the cover, for example may be cast together with the cover if the cover is a casting.

Below, reference will now be made to features which describe particular embodiments of the second pressure medium line and which are applicable equally to the first, second and third variants of the second vehicle axle assembly.

In one embodiment, the second pressure medium line extends through the cover towards and up to a pressure medium connector which is provided on an axial outer side of the cover. In another embodiment, the hub comprises a flange for the fastening of the wheel, wherein the cover is connected to the flange. The second pressure medium line may then extend through the cover and the flange towards and up to a pressure medium line connector provided on the flange. In this case, the second pressure medium line runs in the interior of the cover and of the flange and may be realized for example by way of a bore formed in the cover or in the flange. It is also conceivable for the cover and/or the flange to be produced as a casting with a correspondingly formed line.

The cover may bear in a planar fashion by way of one side against a side of the flange and be held on the flange by suitable fastening means. For example, the cover may bear in a planar fashion by way of an axial inner side against an axial outer side of the flange, and may be fastened thereto for example by way of screws. It is also possible for the cover to be in areal contact, by way of its outer shell surface, with an inner shell surface of the flange. It is indeed also conceivable for the cover to be formed integrally with the flange.

At a transition between the cover and the flange, there may be provided a seal arrangement which ensures that the transition of the second pressure medium line between the two components is pressure-tight. It is for example conceivable for there to be provided at the transition a recess with, arranged therein, a seal ring, for example an O-ring, which is thicker than the recess is deep, such that the seal ring is compressed in the recess during the installation of the cover on the flange, and thus a pressure-tight transition for the second pressure medium line between the cover and the flange is provided.

The pressure medium line connector to which the second pressure medium line extends through the flange may be provided on an axial outer side of the flange. From a pressure medium line connector of said type, the second pressure medium line may run axially outside the flange in a substantially radial direction to a valve of the wheel that is fastened on the flange of the hub. Alternatively, the pressure medium line connector may also be provided on an outer circumferential surface of the flange. The second pressure medium line is advantageously then led towards and up to a radially outermost outer circumferential surface of the flange, such that only a relatively short pressure medium line piece is necessary in order to extend the second pressure medium line from the pressure medium line connector to the valve on the wheel.

To lead the second pressure medium line from a pressure medium connector provided on the flange or on the cover to a valve on the wheel, the second pressure medium line may be, from the pressure medium line connector towards and up to the connection to the valve on the wheel, in the form of a pipeline or hose line. The pressure medium line connector itself may advantageously exhibit a closure mechanism which is easy for a user to handle, for example with a detent engagement function.

In a refinement in which the hub has a flange for the fastening of the wheel and in which the cover is fastened to the flange, the second pressure medium line may also extend through the cover and the flange and then extend along an axial inner side of the flange towards and up to an outer circumferential surface of the flange. On the outer circumferential surface of the flange, the second pressure medium line can run onward, without interruption, to the connection to the valve on the wheel. It is however self-evident that, here, it is also possible for a pressure medium line connector to be provided on the outer circumferential surface of the flange, from which pressure medium line connector the pressure medium line can run onward to the valve on the wheel.

In a refinement, a recess may be formed along the axial inner side of the flange, and the second pressure medium line may be arranged in the recess. Such a recess can facilitate the locating of the second pressure medium line on the axial inner side of the flange. The second pressure medium line may in this case be entirely or only partially sunk into the recess.

Below, reference will be made to features which describe particular embodiments in the region of the ring-shaped chamber of the respectively first variant of the first and second vehicle axle assemblies, in particular with regard to possible designs of the two shaft sealing rings. Since the statements made below are applicable equally to the first and to the second vehicle axle assembly, in order to avoid unnecessary repetitions, the common term "radially outer body" will be used below to refer to the outer race of the first vehicle axle assembly and to the hollow cylindrical projection, which surrounds the end section, or to the hollow cylindrical end section, which surrounds the projection, of the second vehicle axle assembly. Analogously, the common term "radially inner body" will be used to refer to the inner race of the first vehicle axle assembly and to the cylindrical projection, which is surrounded by the end section, or to the cylindrical end section, which is surrounded by the projection, of the second vehicle axle assembly.

Each of the two shaft sealing rings may be designed and arranged so as to be fixed to the radially outer body, for example by way of frictional engagement, and to slide on the outer shell surface of the radially inner body during a rotation of the radially outer body around the radially inner body. Likewise, it is possible for each of the two shaft sealing rings to be fixed to the radially inner body and to slide on the inner shell surface of the radially outer body during a rotation of the radially outer body around the radially inner body. If the first pressure medium line opens through one of the two shaft sealing rings into the ring-shaped chamber, the shaft sealing ring in question must be fixed relative to the axle body. If the first pressure medium line opens through the radially inner body into the ring-shaped chamber, the two shaft sealing rings may each individually be fixed relative to the radially inner body or relative to the radially outer body.

In the event of pressure medium being supplied through the first pressure medium line, a positive pressure, that is to say a pressure higher than atmospheric pressure, is generated in the ring-shaped chamber, which seeks to force the two shaft sealing rings axially apart. To counteract axial drifting-apart of the two shaft sealing rings, it is possible for at least one of the two shaft sealing rings, but preferably both shaft sealing rings, to be equipped with a radial collar adjacent to the ring-shaped chamber. If one shaft sealing ring is fixed to the radially outer body, then a collar of said type is formed radially at the inside on the shaft sealing ring. If a shaft sealing ring is fixed to the radially inner body, then the collar is formed radially at the outside on the shaft sealing ring. In both cases, the frictional force generated by the collar on the contacting surface leads to improved axial fixing of the respective shaft sealing ring.

A possible drifting-apart of the two shaft sealing rings may also be countered in that, on the outer shell surface of the radially inner body, opposite a radially inner collar of a shaft sealing ring, there is provided a ring-shaped groove into which the collar projects radially. Analogously, on the inner shell surface of the radially outer body, opposite a radially outer collar of a shaft sealing ring, there may be provided a ring-shaped groove into which the collar projects radially. It is also possible, on the outer shell surface of the radially inner body, for a rib to be provided which extends in a circumferential direction and on which a radially inner collar of a shaft sealing ring is axially supported at least when a positive pressure prevails in the chamber. Analogously, on the inner shell surface of the radially outer body, there may be provided a rib which extends in a circumferential direction and on which a radially outer collar of a shaft sealing ring is axially supported at least when a positive pressure prevails in the chamber.

Furthermore, axial drifting-apart of the two shaft sealing rings may also be prevented by virtue of the two shaft sealing rings being coupled to one another in axially rigid or elastic fashion. A rigid coupling may be realized for example by way of the attachment of one or more rigid connecting elements between the two shaft sealing rings. Elastic coupling may be realized for example by way of the attachment of one or more spring elements between the two shaft sealing rings. The two shaft sealing rings may also be manufactured as a unit, wherein it is necessary to provide a free space required between the two shaft sealing rings for forming the ring-shaped chamber, with radial passages.

In order that a positive pressure in the ring-shaped chamber can be withstood more effectively, it is possible for at least one of the shaft sealing rings to have, in particular in the region of the collar, a core composed of a material which stiffens the shaft sealing ring. It may also be provided that a section of the core provided in a region of the collar is pivotable relative to the rest of the core or is arranged so as to be articulated relative to the rest of the core.

In a further refinement, at least one of the shaft sealing rings has at least one duct which extends in a substantially radial direction from an inner cavity of the shaft sealing ring to a circumferential surface of the shaft sealing ring situated in a region between the collar and a main sealing lip of the shaft sealing ring. Through a duct of said type, lubricant situated in the cavity can pass to the collar and to the main sealing lip and, there, ensure permanent lubrication of the sealing surfaces of the shaft sealing ring on the radially inner and on the radially outer body. In order to permit a permanent provision of lubricant, the cavity may, on that side of the shaft sealing ring which is averted from the ring-shaped chamber, be equipped with a lateral cover. The cavity sealed off in this way can be filled with a lubricant and then serve as a lubricant reservoir which gradually releases lubricant through the at least one duct for the lubrication of the sealing surfaces of the shaft sealing ring on the radially inner and the radially outer body. It is also conceivable for the lateral cover of the shaft sealing ring to be equipped with at least one lubricant inlet opening which leads into the inner cavity of the shaft sealing ring. Such an embodiment makes it possible, for example in the case of the first vehicle axle assembly, for lubricant situated in the ball bearing to enter through the lubricant inlet opening into the cavity of a shaft sealing ring and to be distributed from there, as described, to the sealing surfaces of the shaft sealing ring.

In one refinement, a sponge-like material, for example a foamed material, may be provided in the cavity, which material fills at least a part of the cavity and covers the at least one duct. "Sponge-like" is intended here to mean a certain absorbency or a general suitability for absorbing and storing liquids. It is self-evident that, instead of foamed material, use may also be made of other materials with similar characteristics. An intermediate space between the collar and the main sealing lip may also be at least partially filled with a sponge-like material. Owing to the presence of the sponge-like material, lubricant situated in the cavity of the shaft sealing ring does not flow off to the sealing surfaces of the shaft sealing ring immediately, but rather is initially absorbed by the sponge-like material and is only gradually released again and distributed uniformly to the sealing surfaces of the shaft sealing ring on the radially outer and radially inner body. To allow lubricant to be conducted from the cavity of one shaft sealing ring into the cavity of the other shaft sealing ring, the cavities of the two shaft sealing rings may also be connected to one another by way of at least one line. Lubricant situated in one cavity can thus be distributed between both cavities.

For a more detailed description of these particular embodiments and of further possible embodiments of the respective first variant of the first and second vehicle axle assemblies in the region of the ring-shaped chamber, reference is made to the international patent application with the application number PCT/EP2013/069599. By contrast to the illustration above, the shaft sealing rings described in said application are however arranged directly between the axle body and the hub. The statements in the cited international application can however be transferred analogously to the above illustration by replacing the hub described therein with "radially outer body" and the axle body described therein being replaced with "radially inner body".

Below, reference will be made to features which describe particular embodiments in the region of the ring-shaped chamber of the respective second variant of the first and second vehicle axle assemblies, in particular with regard to possible designs of the shaft sealing ring.

The pressure medium inlet provided on the shaft sealing ring may be arranged in any desired outer wall of the main body of the shaft sealing ring, for example in a lateral outer wall or in the outer wall which forms the sealing surface, running in the circumferential direction, of the shaft sealing ring. If the inlet is formed in the latter outer wall, the first and second pressure medium line extending through the shaft sealing ring may be formed within the radially inner and radially outer body respectively, for example by a bore which is formed in the body and the outlet opening of which is brought into overlap with the inlet of the shaft sealing ring. By contrast, if the inlet is formed in a lateral outer wall of the main body, the pressure medium line may run on the outside on the radially inner and radially outer body in order to be connected to the pressure medium inlet provided in the lateral outer wall.

The fluid-conducting connection provided between the pressure medium inlet and the pressure medium outlet in the shaft sealing ring may be realized by way of a duct formed in the material of the main body, which duct connects the inlet to the outlet. It is also conceivable for a pipe-like line to lead from the inlet to the outlet. If the inlet of the shaft sealing ring is formed in a lateral outer wall of the main body, a pipe-like line may also extend beyond the lateral outer wall of the shaft sealing ring and have a connector suitable for connection to the pressure medium line provided on the radially inner or radially outer body.

To counteract excessive axial moving-apart of the two circumferential sealing lips, which delimit the outer cavity of the shaft sealing ring, when a positive pressure prevails in the ring-shaped chamber, it is possible for a ring-shaped groove to be provided on the shell surface, which is in contact with the circumferential sealing lips, of the radially inner and of the radially outer body opposite at least one of the circumferential sealing lips, into which ring-shaped groove the circumferential sealing lip projects radially. It is also possible, on the shell surface, which is in contact with the circumferential sealing lips, of the radially inner and of the radially outer body, for there to be provided a rib which extends in a circumferential direction and on which at least one of the circumferential sealing lips is axially supported at least when a positive pressure prevails in the chamber. Axial moving-apart of the two shaft sealing rings may also be prevented by virtue of the two shaft sealing rings being axially rigidly coupled to one another, for example by way of the attachment of one or more rigid connecting elements between the two circumferential sealing lips.

In one advantageous refinement, the main body of the shaft sealing ring may have an inner cavity which is separated in pressure-tight fashion from the outer cavity. Said separation may be realized for example by way of a wall which separates the inner cavity from the outer cavity and which is formed either from the main body material itself, that is to say is formed in one piece with the main body, or by a ring-shaped separating element which is separately fastened in the main body. The inner cavity may contain a lubricant which can be used for the permanent lubrication of the dynamically loaded sliding surfaces of the circumferential sealing lips of the shaft sealing ring. To lead the lubricant situated in the inner cavity to the sliding surfaces of the circumferential sealing lips, it is possible for at least one lubricant duct to extend from the inner cavity into at least one of the circumferential sealing lips and to open out at the sliding surface of the respective circumferential sealing lip.

To improve the sealing action of the shaft sealing ring in the region of the ring-shaped chamber, a further radially extending circumferential sealing lip may be provided adjacent to at least one of the circumferential sealing lips which delimit the outer cavity of the shaft sealing ring, wherein a ring-shaped intermediate space is provided between a circumferential sealing lip which delimits the outer cavity and a further, adjacent circumferential sealing lip. In the case of such an embodiment, at least one lubricant duct may extend from the inner cavity into the intermediate space between two adjacent circumferential sealing lips. Lubricant present in the inner cavity can then pass via the lubricant duct into the intermediate space between the respective adjacent circumferential sealing lips and, there, lubricate the sliding surfaces of the circumferential sealing lips.

To form a lubricant reservoir suitable for the provision of lubricant, the inner cavity of the shaft sealing ring may be sealed off to the outside, in particular to the side. In another refinement, a lateral outer wall of the shaft sealing ring may be equipped with at least one lubricant inlet opening which leads into the inner cavity. It is also possible for the intermediate space between adjacent circumferential sealing lips to be at least partially filled with a sponge-like foamed material. A sponge-like foamed material may likewise be provided in the inner cavity, which material fills at least a part of the inner cavity and covers an inlet opening of the at least one lubricant duct.

In a further embodiment, a core which is accommodated in the main body and which stiffens the main body may be extended into a region from which at least one circumferential sealing lip extends. The stiffening core may also be extended into at least one circumferential sealing lip. In one refinement, a section of the core present in one of the circumferential sealing lips may be pivotable relative to the rest of the core or arranged so as to be articulated relative to the rest of the core.

For a more detailed description of these particular embodiments and of further possible embodiments of the respective second variant of the first and second vehicle axle assemblies in the region of the ring-shaped chamber, reference is made to the German patent application with the application number 10 2013 017 879.7. By contrast to the illustration above, the shaft sealing ring described in said application is however arranged directly between the axle body and the hub. The statements in the cited German application can however be transferred analogously to the above illustration by replacing the hub described therein with "radially outer body" and the axle body described therein being replaced with "radially inner body".

Below, reference will be made to features which describe particular embodiments in the region of the ring-shaped chamber of the respective third variant of the first and second vehicle axle assemblies, in particular with regard to possible designs of the sealing ring arranged in the ring-shaped profile.

Again, in the event of pressure medium being supplied into the ring-shaped chamber, a positive pressure is generated which, in this case, seeks to push the sealing ring axially out of the ring-shaped profile. To counteract such pushing-out of the sealing ring, a bracket may be provided which, in the case of axially running side walls of the ring-shaped profile, fixes the axial position of the sealing ring and, in the case of radially running side walls of the ring-shaped profile, fixes the radial position of the sealing ring. It is also possible for a support to be provided on the ring-shaped profile, for example in the form of a circumferential rib, which is formed on a side wall or on both side walls of the ring-shaped profile. Furthermore, the sealing ring may, adjacent to the ring-shaped chamber, be equipped with a collar radially at the inside and radially at the outside in the case of axially running side walls of the ring-shaped profile, or axially at the inside and axially at the outside in the case of radially running side walls of the ring-shaped profile, which collar, at least when a positive pressure prevails in the chamber, is pushed against the side walls of the ring-shaped profile and thus contributes, by way of the friction force thus generated, to axial fixing of the sealing ring in the case of axially running side walls or to radial fixing of the sealing ring in the case of radially running side walls. In the case of axially running side walls of the ring-shaped profile, the radially inner collar and the radially outer collar can be supported axially in form-fitting fashion in the ring-shaped chamber, and in the case of radially running side walls of the ring-shaped profile, the axially inner collar and the axially outer collar can be supported radially in form-fitting fashion in the ring-shaped chamber, for example on a support structure which is provided at the inside on the side walls of the ring-shaped profile. A support structure of said type may be designed analogously to the variants described above, for example as a groove or as a rib, on which the respective collar can be supported at least when a positive pressure prevails in the ring-shaped chamber.

The sealing ring may, in particular in the region of at least one of the two collars, have a core composed of a material which stiffens the sealing ring, and a section of the core provided in the region of the collar may be pivotable relative to the rest of the core or arranged so as to be articulated relative to the rest of the core. Furthermore, the sealing ring may have at least one duct which extends from an inner cavity of the sealing ring, in a substantially radial direction in the case of a ring-shaped profile with axially running side walls or in a substantially axial direction in the case of a ring-shaped profile with radially running side walls, to a circumferential section of the sealing ring situated in a region between a collar and a main sealing lip of the sealing ring. Furthermore, the cavity may, on that side of the sealing ring which faces away from the ring-shaped chamber, be equipped with a cover, and the cavity sealed off in this way may be filled with a lubricant which can be gradually released for the lubrication of the sealing surfaces of the sealing ring. Furthermore, in the cavity, there may be provided a sponge-like foamed material which fills at least a part of the cavity and which covers the at least one duct. It is likewise possible for an intermediate space between the collar and the main sealing lip to be at least partially filled with a sponge-like foamed material.

For a more detailed description of these particular embodiments and of further possible embodiments of the respective third variant of the first and second vehicle axle assemblies in the region of the ring-shaped chamber, reference is again made to the international patent application with the application number PCT/EP2013/069599. By contrast to the illustration above, the ring-shaped profile described in said international application is however connected directly to the hub. The statements in the international application can however be transferred analogously to the above illustration by replacing the hub with the cover or the projection formed on the cover.

BRIEF DESCRIPTION OF THE DRAWINGS

Several exemplary embodiments of a vehicle axle assembly according to the invention will be discussed in more detail below with reference to the appended schematic drawings, in which.

DETAILED DESCRIPTION

In the following description of exemplary embodiments, the same reference designations are used to denote identical elements or elements of identical action.

Figure 1:
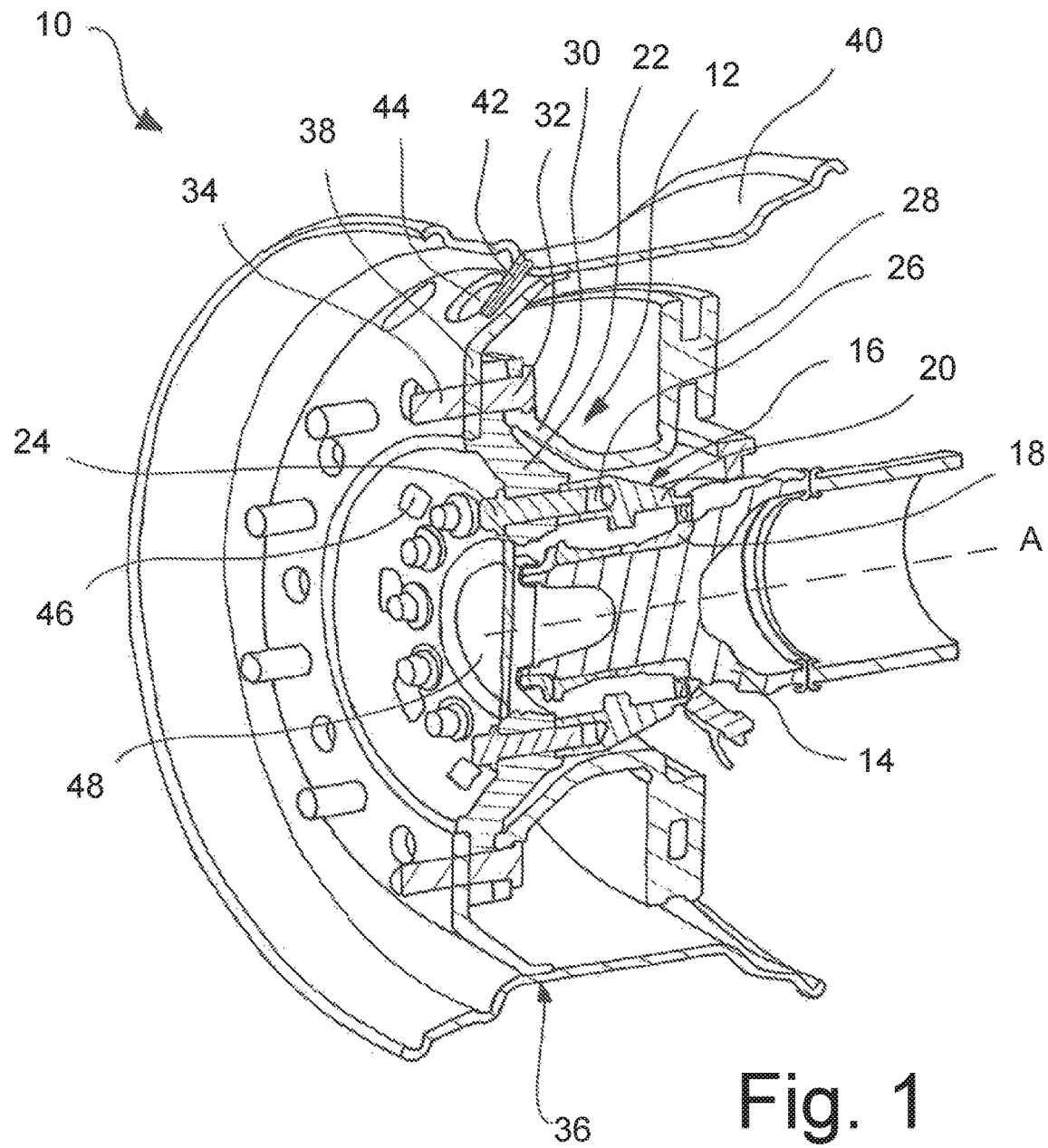
FIG. 1 shows a perspective sectional view of a known vehicle axle assembly.

FIG. 1 shows, in a perspective sectional view and by way of example, a vehicle axle assembly 10 such as is used for example for trailers of heavy goods vehicles and utility vehicles. The vehicle axle assembly 10 comprises a hub 12 which is mounted on a cylindrical axle body 14 by way of a ball bearing 16 so as to be rotatable about a central longitudinal axis A. The ball bearing 16 has an inner race 18 connected to the axle body 14 and an outer race 20 which, in this example, forms part of the hub 12. A flange 22 is fastened to the outer race 20 by way of a multiplicity of screws 24 which are received into threaded bores 26 which extend in an axial direction through the flange 22 towards and up to the outer race 20. In the example shown, the flange 22 is arranged axially outside the outer race 20 and bears by way of an axial inner side against an axial outer side of the outer race 20. In addition to the outer race 20, the flange 22 also forms a part of the hub 12.

A brake disk 28 is mounted, by way of a bracket 30 in the form of a collar, on an axial inner side of the flange 22 in the region of the outer circumferential surface thereof. For the mounting of the bracket 30, screws 32 are used which extend through the flange 22 from the axial inner side of said flange and which protrude beyond said flange on the axial outer side thereof. Said protruding lengths of the screws 32 simultaneously serve as bolts 34 by way of which a wheel 36 is fastened by way of a wheel disk 38 to the flange 22. Here, the wheel disk 38 is pushed onto the bolts 34 and bears by way of its axial inner side in a planar fashion against an axial outer side of the flange 22. To the wheel disk 38 there is fastened a wheel rim 40 on which there is provided a valve 42 by way of which a tire (not illustrated) mounted on the wheel rim 40 can be filled with air. The valve 42 is arranged axially outside the wheel disk 38.

On the wheel disk 38, there are formed passage holes 44 which are arranged so as to be distributed uniformly in a circumferential direction and which extend from an axial inner side to an axial outer side of the wheel disk. In the same way, on the flange 22, there are formed passage holes 46 which are arranged so as to be distributed uniformly in a circumferential direction and which extend from an axial inner side to an axial outer side of the flange 22. Finally, radially at the inside on the flange 22, there is fitted a cover 48 which covers an axial end of the axle body 14 and which thus shields the axle body 14 with respect to external environmental influences. The cover 48, like the flange 22 and the outer race 20, forms a part of the hub 12 and rotates together with the hub 12 during a rotation of said hub around the axle body 14.

The exemplary embodiments described below are based on the vehicle axle assembly 10 illustrated in FIG. 1 and modify the latter in order to permit an autonomous supply of pressure medium from a pressure medium source provided in the vehicle into the tire (not illustrated) mounted on the wheel 36.

In this regard, FIGS. 2 to 5 illustrate possible exemplary embodiments of the first vehicle axle assembly described in the introduction.

Figure 2:
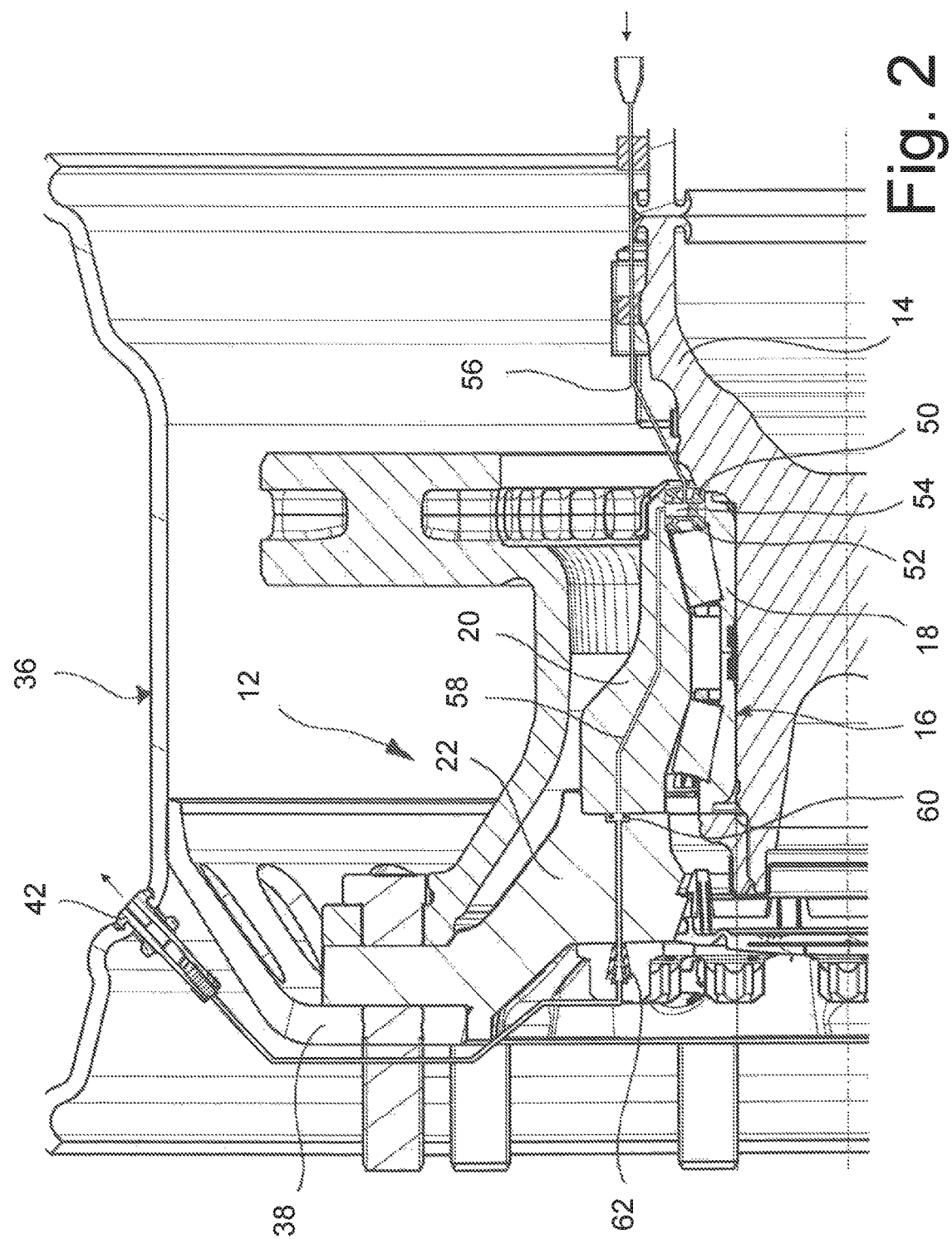
FIG. 2 shows an exemplary embodiment of the first vehicle axle assembly, in the case of which the second pressure medium line runs axially outside the flange.

FIG. 2 shows a first exemplary embodiment of the first vehicle axle assembly in the first variant. In this example, an axially inner shaft sealing ring 50 and an axially outer shaft sealing ring 52 are sealingly arranged between the inner race 18 and the outer race 20 in the region of the axially inner end of the ball bearing 16, and, between them, the outer shell surface of the inner race 18 and the inner shell surface of the outer race 20 delimit a ring-shaped chamber 54 which is suitable for conducting pressure medium. The two shaft sealing rings 50 and 52 furthermore form an outer skin, which imparts a sealing action, for the ball bearing 16, which outer skin prevents an ingress of dust and dirt particles into the ball bearing 16 and prevents an escape of lubricants from the ball bearing. For space reasons, the region of the ring-shaped chamber 54 with the shaft sealing rings 50 and 52 is illustrated here merely in simplified form, and not in accurate detail. A possible detailed embodiment of said region will be described in more detail further below on the basis of FIG. 12.

A first pressure medium line 56 extends along the axle body 14 from a pressure medium source (not illustrated) provided in the vehicle, which pressure medium source may for example be a compressor for generating compressed air or a tank with pressurized tire filling agent. The first pressure medium line 56 extends through the axially inner shaft sealing ring 50 in order to open into the ring-shaped chamber 54. The profile, shown here, of the first pressure medium line 56 is indeed merely an example. It is self-evident that the first pressure medium line 56 may, at least in sections, also run through the axle body 14 and in particular through the inner race 18, in order to open into the ring-shaped chamber 54 through the inner race 18.

Out of the ring-shaped chamber 54 there runs a second pressure medium line 58 which, at its end remote from the chamber, is configured to be connected to the valve 42 provided on the wheel 36. In the example shown, the second pressure medium line 58 extends through the outer race 20 in a substantially axial direction to the axial outer side thereof, and then transitions into the flange 22 which is fastened to the outer race 20. To ensure a pressure-tight transition of the second pressure medium line 58 between the outer race 20 and the flange 22, a recess 60 is provided on that side of the flange 22 which bears against the axial outer side of the outer race 20, in which recess there is arranged a sealing ring, for example an O-ring, which, during the mounting of the flange 22 on the outer race 20, is compressed in the recess 60 and seals off the second pressure medium line 58. The second pressure medium line 58 subsequently extends through the flange 22 in a substantially axial direction towards and up to a pressure medium line connector 62 which is provided on an axial outer side of the flange 22. The second pressure medium line 58 may run through the outer race 20 and the flange 22 for example by way of bores formed into said components. It is however self-evident that the components may also be produced as castings with correspondingly formed lines.

From the pressure medium line connector 62, the second pressure medium line 58 extends, in its further profile, as a pipeline in a substantially radial direction along the axial outer side of the flange 22 and axially outside the wheel disk 38, and is finally connected to the valve 42. The pressure medium line connector 62 may advantageously be realized with a closure mechanism which is easy for a user to handle, for example with a detent engagement function.

By way of the arrangement described in FIG. 2 of the first pressure medium line 56, of the ring-shaped chamber 54 and of the second pressure medium line 58, it is possible for pressure medium to be conducted from a vehicle-mounted pressure medium source to the rotating wheel 36. Whereas the axle body 14 and the first pressure medium line 56 are fixed, the hub 12, and the components connected to the hub 12, that is to say in particular the second pressure medium line 58, rotate during travel, which second pressure medium line is, during the course of the rotation, coupled in fluid-conducting fashion to the first pressure medium line 56 at all times via the ring-shaped chamber 54. Since said coupling is independent of the respective rotational position of the hub 12, a supply or discharge of pressure medium is possible not only when at a standstill but also during travel, when the hub 12 is rotating. By way of the described arrangement, tire pressure regulation can therefore be readily automated.

Figure 3:
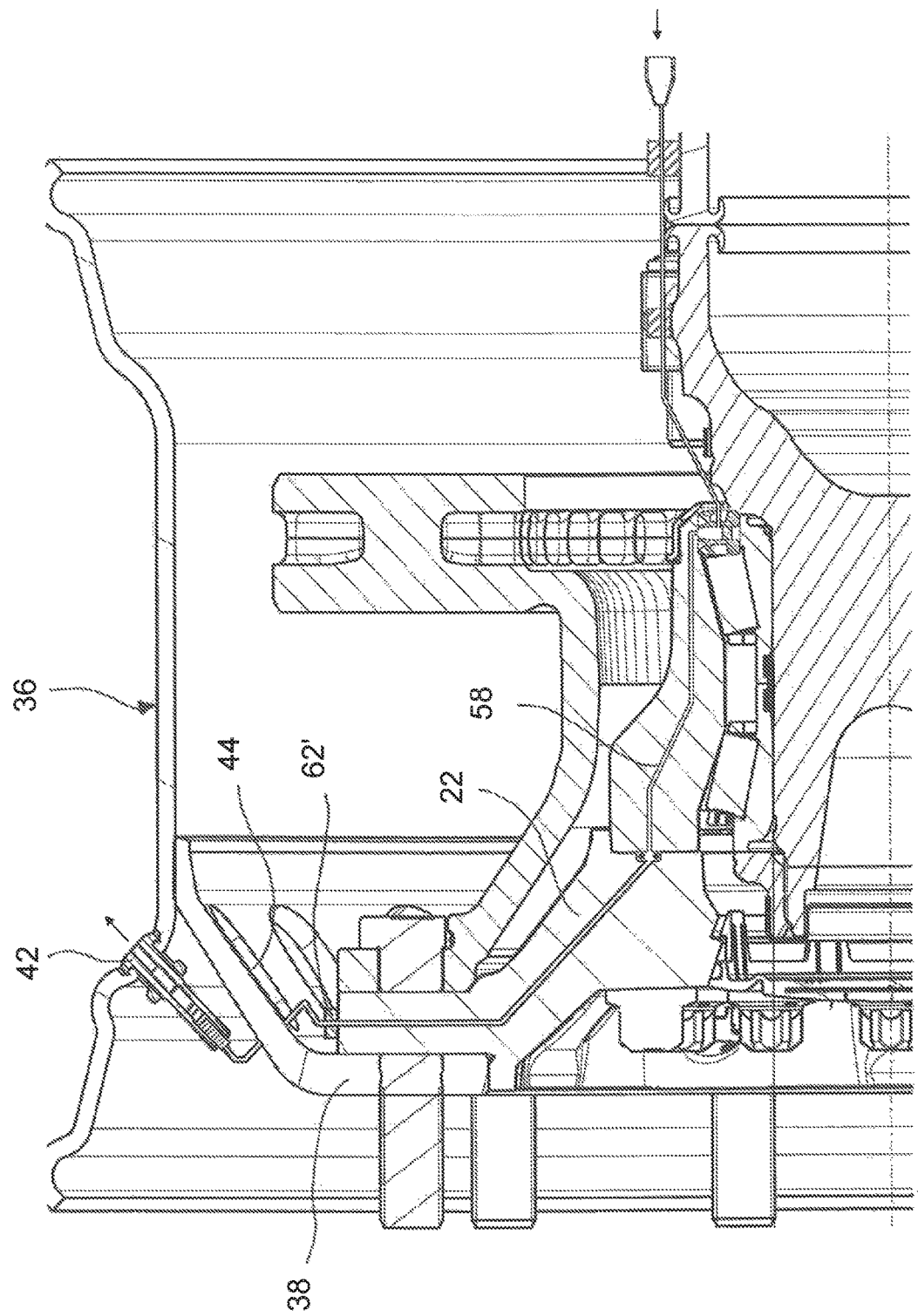
FIG. 3 shows an exemplary embodiment of the first vehicle axle assembly, in the case of which the second pressure medium line runs through the flange to the outer circumferential surface thereof.

FIG. 3 shows another exemplary embodiment of the first vehicle axle assembly in the first variant. This example is substantially the same as the example of FIG. 2 but differs therefrom by the fact that the second pressure medium line 58 runs through the flange 22 not up to a pressure medium line connector 62 which is provided on an axial outer side of the flange 22 but only up to a pressure medium line connector 62' which is provided on an outer circumferential surface of the flange 22. Said pressure medium line connector 62', which is merely schematically indicated in the illustration of FIG. 3, on the outer circumferential surface of the flange 22 may be a detachable connector with a valve (not illustrated) which automatically closes the second pressure medium line 58 when that part of the pressure medium line 58 which leads to the wheel 36 is separated from the pressure medium line connector 62'. The second pressure medium line 58 extends from the pressure medium line connector 62' as a hose line or pipeline in a substantially radial direction and is initially guided axially within the wheel disk 38, subsequently extends through a passage hole 44 formed in the wheel disk 38, and then runs axially outside the wheel disk 38 towards and up to the connection to the valve 42 provided on the wheel 36. An advantage of this variant is that the second pressure medium line 58 is guided so as to be protected against external environmental influences over a major part of its length.

Figure 4:
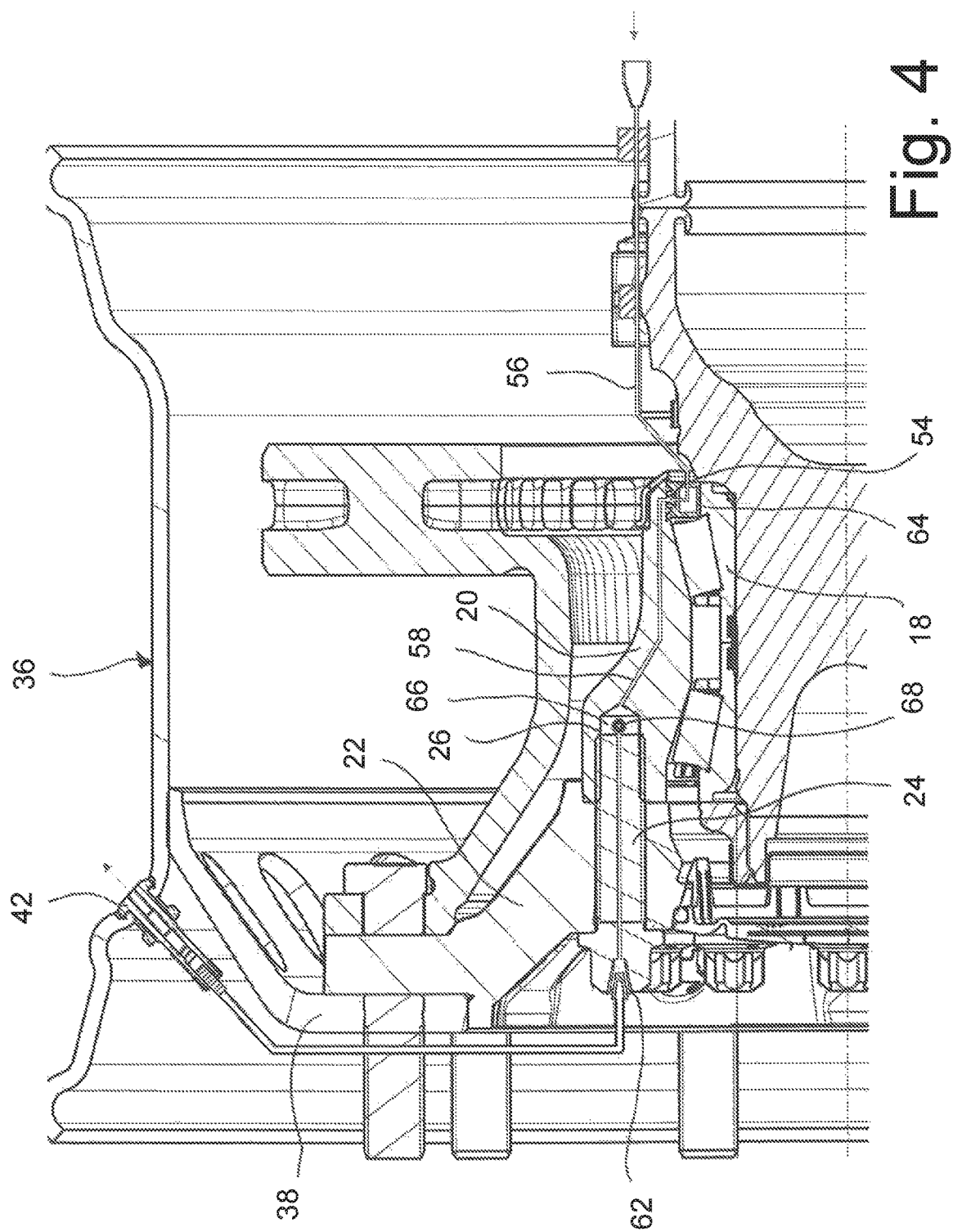
FIG. 4 shows an exemplary embodiment of the first vehicle axle assembly, in the case of which the second pressure medium line runs through a screw.

FIG. 4 shows a further exemplary embodiment in which the coupling, which is suitable for conducting pressure medium, is designed as per the second variant of the first vehicle axle assembly. The ring-shaped chamber 54 is in this case produced by way of a shaft sealing ring 64, the circumferential sealing lips of which are formed on the outer shell surface thereof. The shaft sealing ring is sealingly arranged between the two races 18 and 20, such that the ring-shaped chamber 54 is delimited between its outer shell surface, two of its circumferential sealing lips, and the inner shell surface of the outer race 20. The first pressure medium line 56 extends through the shaft sealing ring 64 in order to open into the ring-shaped chamber 54. The second pressure medium line extends out of the ring-shaped chamber through the outer race 20. In this case, too, the region of the ring-shaped chamber 54 with the shaft sealing ring 64 is, for space reasons, illustrated only in simplified form and not in accurate detail. A possible detailed embodiment of said region will be described in more detail further below on the basis of FIG. 13.

In its further profile, the second pressure medium line 58 runs towards and up to the base of a bore 26 in which a pressure medium line screw 24 is received. The length of the pressure medium line screw 24 is dimensioned such that it does not extend all the way to the base of the bore 26, such that a cavity 66 which is suitable for conducting pressure medium is formed at the base of the bore 26. The pressure medium line screw 24 itself has a bore which extends from its tip to its head. On the head of the screw 24, there is provided a pressure medium line connector 62. Proceeding from the pressure medium line connector 62, the second pressure medium line 58 is led axially outside the flange 22 and the wheel disk 38 in a substantially radial direction towards and up to the connection to the valve 42 on the wheel 36.

Furthermore, in the illustration of FIG. 4, in the region of the cavity 66 at the base of the bore 26, there is indicated a ring-shaped duct 68 which extends into the plane of the drawing of FIG. 4 and which runs through the outer race 20 in the circumferential direction of the outer race 20 and which connects all of the bores 26 of all of the screws 24, by way of which the flange 22 is fastened to the outer race 20, to one another in fluid-conducting fashion. Such a fluid-conducting connection of the individual bores 26 has the advantage that, during the mounting of the flange 22 on the outer race 20, it is not important for the pressure medium line screw 24 to be screwed into precisely that bore 26 at whose base the second pressure medium line 58 opens out. By way of the fluid-conducting connection of the cavities 66, the pressure medium line screw 24 can be screwed into any bore 26, wherein a pressure medium supply into the screw 24 is ensured at all times by way of the interconnected cavities 66.

Figure 5:
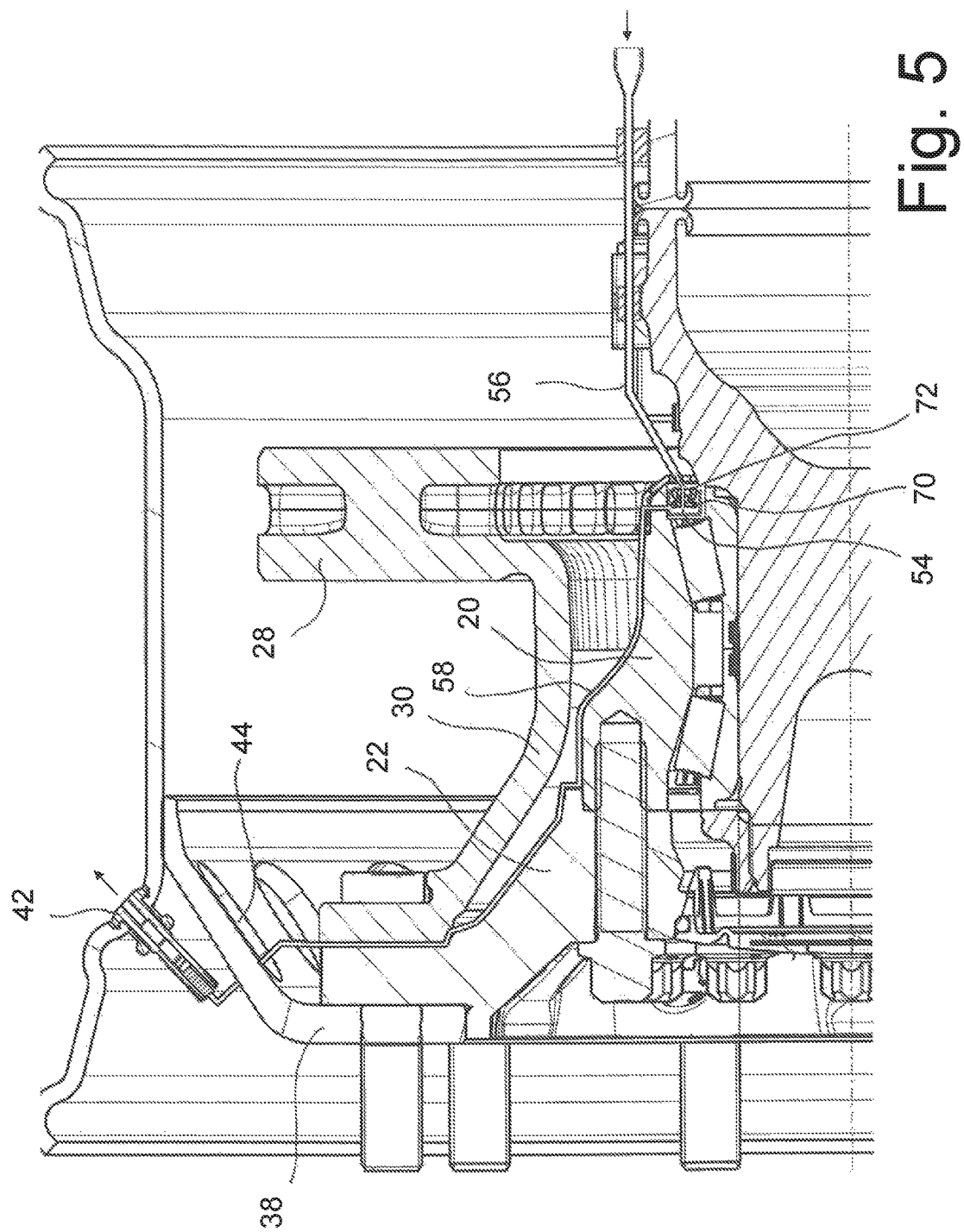
FIG. 5 shows an exemplary embodiment of the first vehicle axle assembly, in the case of which the second pressure medium line is led axially within the flange.

FIG. 5 shows a further exemplary embodiment, in which the coupling, which is suitable for conducting pressure medium, is designed as per the third variant of the first vehicle axle assembly. The ring-shaped chamber 54 is in this case delimited between the axially running side walls of a ring-shaped profile 70 of U-shaped cross section, which is connected to the inner shell surface of the outer race 20, and a sealing ring 72 which is non-rotatable with respect to the inner race 18. The first pressure medium line 56 extends through the sealing ring 72 into the ring-shaped chamber 54, and the second pressure medium line 58 extends from the ring-shaped chamber 54 through the ring-shaped profile 70 and the outer race 20. In this case, too, the region of the ring-shaped chamber 54 with the ring-shaped profile 70 and the sealing ring 72 is, for space reasons, illustrated merely in simplified form and not in accurate detail. A possible detailed embodiment of said region will be described in more detail below on the basis of FIG. 14.

In the exemplary embodiment illustrated here, the second pressure medium line 58 extends from the ring-shaped chamber 54 in a radial direction to the outer shell surface of the outer race 20. From there, the second pressure medium line 58 runs as a pipeline along the outer shell surface of the outer race 20 towards and up to the flange 22, and then along an axial inner side of the flange 22 towards and up to an outer circumferential surface of the flange 22. It is advantageously possible for the second pressure medium line 58, over its partial length along the outer shell surface of the outer race 20 and along the axial inner side of the flange 22, to be arranged in a recess formed in said components. The second pressure medium line 58 may for example be sunk over half of its circumference into the recess. In the region of the axial inner side of the flange 22, against which the bracket 30 of the brake disk 28 bears, a recess may additionally be formed on that surface of the bracket 30 which bears against the flange 22, such that the pressure medium line 58 is sunk half into the recess of the flange 22 and half into the recess of the bracket 30 and is thus fixed between these. Such an arrangement of the second pressure medium line 58 along the axial inner side of the flange 22 is particularly advantageous because said second pressure medium line can be easily located and installed, for example by being simply pressed into the recess, and is furthermore fixed in position owing to the guidance between the flange 22 and the bracket 30. Furthermore, in this embodiment, too, the second pressure medium line 58 is protected against external environmental influences over a major part of its length.

In the example shown, no pressure medium line connector is provided on the outer circumferential surface of the flange 22, with the second pressure medium line 58 rather instead being led onward seamlessly in a radial direction through a passage bore 44 formed in the wheel disk 38 towards and up to the connection to the valve 42. It is self-evident that a suitable pressure medium line connector may also be provided on the outer circumferential surface of the flange 22.

FIGS. 6 to 11 illustrate below possible exemplary embodiments of the second vehicle axle assembly described in the introduction.

Figure 6:
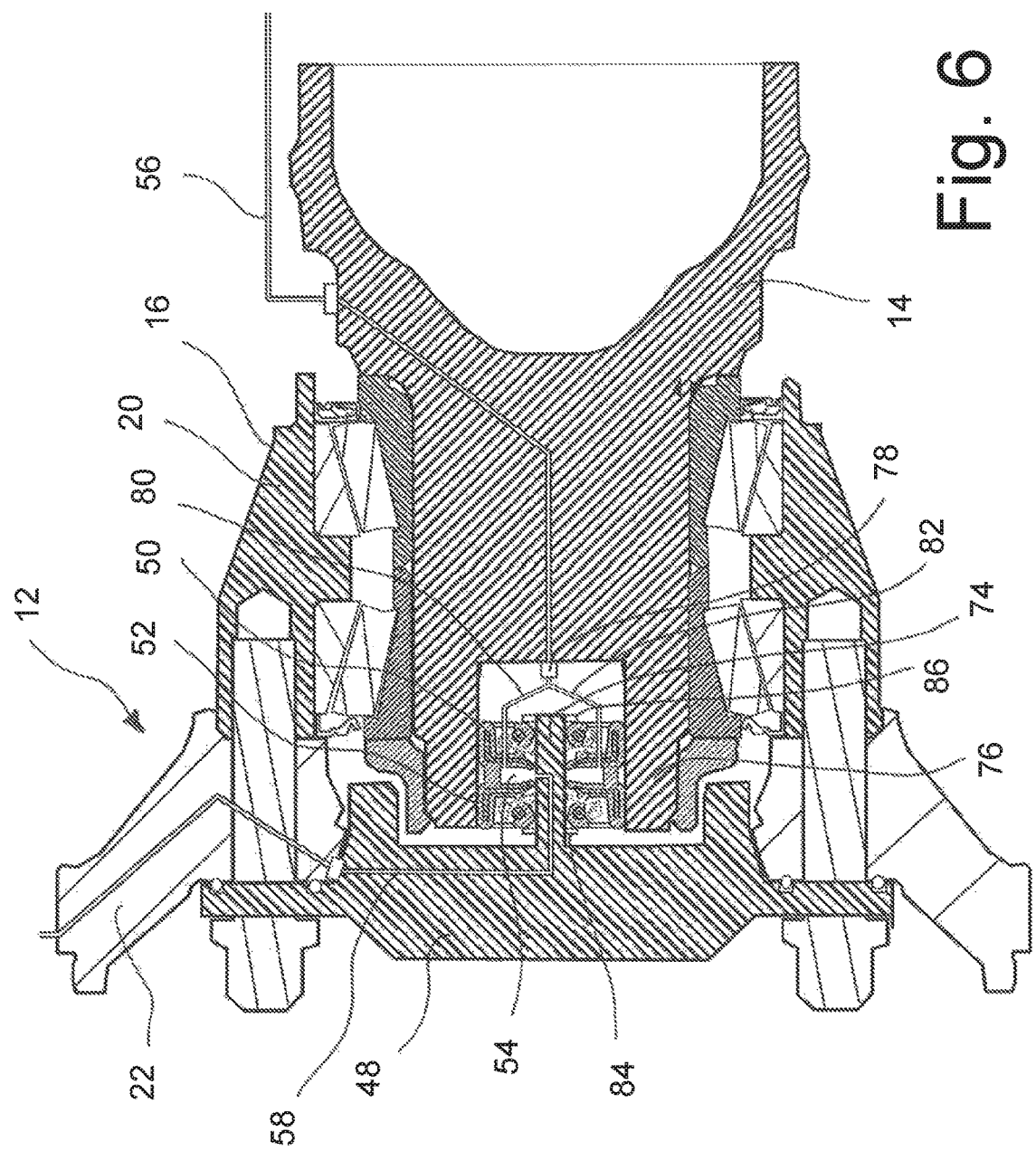
FIG. 6 shows an exemplary embodiment of the second vehicle axle assembly, in the case of which a hollow cylindrical end section of the axle body surrounds a cylindrical projection of the cover.

FIG. 6 shows a first exemplary embodiment of the second vehicle axle assembly in the first variant. In this example, there is formed on an axial inner side of the cover 48 a cylindrical projection 74 which axially overlaps a hollow cylindrical end section 76 of the axle body 14 and which is surrounded by said end section in the region of the axial overlap. An axially inner shaft sealing ring 50 and an axially outer shaft sealing ring 52 are sealingly arranged between the projection 74 and the end section 76 and, between them, the outer shell surface of the projection 74 and the inner shell surface of the end section 76 delimit a ring-shaped chamber 54 which is suitable for conducting pressure medium onward. Here, for space reasons, the region of the ring-shaped chamber 54 with the shaft sealing rings 50 and 52 is illustrated merely in simplified form and not in accurate detail. A possible detailed embodiment of said region will be described in more detail further below on the basis of FIG. 12.

A first pressure medium line 56 extends, from a pressure medium source (not illustrated) provided in the vehicle, which pressure medium source may for example be a compressor for generating compressed air or a tank with pressurized tire filling agent, firstly outside the axle body 14 before subsequently being led through the axle body 14, for example in a bore, towards and up to a pressure medium line connector 78 which is provided on an axial outer side of the axle body 14, from which the hollow cylindrical end section 76 extends axially outward. From said pressure medium line connector 78, the first pressure medium line 56 is then led through the axially inner shaft sealing ring 50 in order to open into the ring-shaped chamber 54. Before the first pressure medium line 56 extends through the axially inner shaft sealing ring 50, however, said first pressure medium line firstly splits into two sub-lines 80 and 82 which, in turn, open through the axially inner shaft sealing ring 50 into the ring-shaped chamber 54. The profile of the first pressure medium line 56 shown here is indeed merely an example. It is also self-evident that the first pressure medium line 56 may also be led to the pressure medium line connector 78 in some other way. It is also self-evident that splitting of the first pressure medium line 56 into sub-lines is merely optional.

The splitting of the first pressure medium line 56 into the two sub-lines 80 and 82 is however advantageous in particular because, during the mounting of the cover 48, the two shaft sealing rings 50 and 52 can be inserted more easily, together with said cover, into the cavity of the hollow cylindrical end section 76. During said insertion, that line section of the first pressure medium line 56 which is connected to the axially inner shaft sealing ring 50 is to be connected to the pressure medium line connector 78. If only a single line section of the first pressure medium line 56 is provided, said single line section is, under some circumstances, so labile that it can be brought into overlap with the pressure medium line connector 78 only with great effort. By contrast, if, as illustrated, two sub-lines are merged proceeding from the shaft sealing ring 50 in the direction of the pressure medium line connector 78, said sub-lines stabilize one another and permit defined guidance of said line section during the mounting of the cover 48. Splitting into even more than two sub-lines, for example three or four sub-lines, may advantageously be provided in order to realize a line structure which is even more stable in this regard. Also, for stability reasons, it may be expedient for the sub-lines to be arranged on the shaft sealing ring 50 so as to be distributed uniformly in the circumferential direction thereof before said sub-lines open into the ring-shaped chamber. To furthermore provide an easily handlable coupling to the pressure medium line connector 78, the pressure medium line connector 78 may exhibit a closure mechanism with smooth motion, which preferably makes do without a detent engagement function. Finally, circumferential ribs 84 and 86 may be formed on the projection 74 axially on both sides of the shaft sealing rings 50 and 52, which circumferential ribs axially support the shaft sealing rings 50 and 52 during the insertion or removal of the cover 48 and prevent the shaft sealing rings 50 and 52 from being axially displaced on the projection 74 or even slipping off said projection entirely.

A second pressure medium line 58 runs out of the ring-shaped chamber 54, which second pressure medium line is, at its end remote from the chamber, configured to be connected to the valve 42 provided on the wheel 36 (not illustrated in FIG. 6). In the example shown, the second pressure medium line 58 extends through the cover 48. Possible embodiments for the further line guidance of the second pressure medium line 58 towards and up to the valve 42 on the wheel 36 will be described in more detail further below on the basis of FIGS. 9 to 11.

By way of the arrangement of the first pressure medium line 56, of the ring-shaped chamber 54 and of the second pressure medium line 58 as described in FIG. 6, it is possible for pressure medium to be conducted from a pressure medium source fixed with respect to the vehicle to the rotating wheel 36. Whereas the axle body 14 and the first pressure medium line 56 are fixed, the hub 12, and the components connected to the hub 12, that is to say in particular the second pressure medium line 58, rotate during travel, which second pressure medium line is, during the course of the rotation, coupled in fluid-conducting fashion to the first pressure medium line 56 at all times via the ring-shaped chamber 54. Since said coupling is independent of the respective rotational position of the hub 12, a supply or discharge of pressure medium is possible not only when at a standstill but also during travel, when the hub 12 is rotating. By way of the described arrangement, tire pressure regulation can therefore be readily automated.

Of major importance in the case of this variant of the second vehicle axle assembly is the fact that the cylindrical projection 74 of the cover 48 and the hollow cylindrical end section 76 of the axle body 14 are oriented coaxially in order that the projection 74 does not begin to sway relative to the end section 76 during a rotational movement of the hub 12 around the axle body 14. To realize a precise orientation of the cover 48, it is the case in the illustrated example that the cover 48 extends radially to such an extent that it bears in a planar fashion by way of an axial inner side against an axial outer side of the flange 22. The screws 24 which are used for the fastening of the flange 22 in the outer race 20 of the ball bearing 16 then also extend through that part of the cover 48 which bears against the flange 22, and thus fix the cover 48 to the flange 22. In another embodiment, it may also be provided that the cover is fastened to the flange 22 by way of separate screws. It is also conceivable for the cover 48 to be formed integrally with the flange 22. Then, however, the cover 48 would be removable only together with the flange 22.

Depending on the profile of the second pressure medium line 58 through the cover 48, it may also be necessary for the cover 48 to be oriented in its circumferential direction during the mounting onto the flange 22, for example in order to ensure that the second pressure medium line 58 which extends through the cover 48 runs in the direction of the valve 42 on the wheel 36. For this purpose, a recess may be provided on the axial outer side of the flange 22, and a projection may be formed on that side of the cover 48 which bears against said side of the flange 22, which projection engages into the recess on the flange 22 when the cover 48 is correctly oriented.

Figure 7:
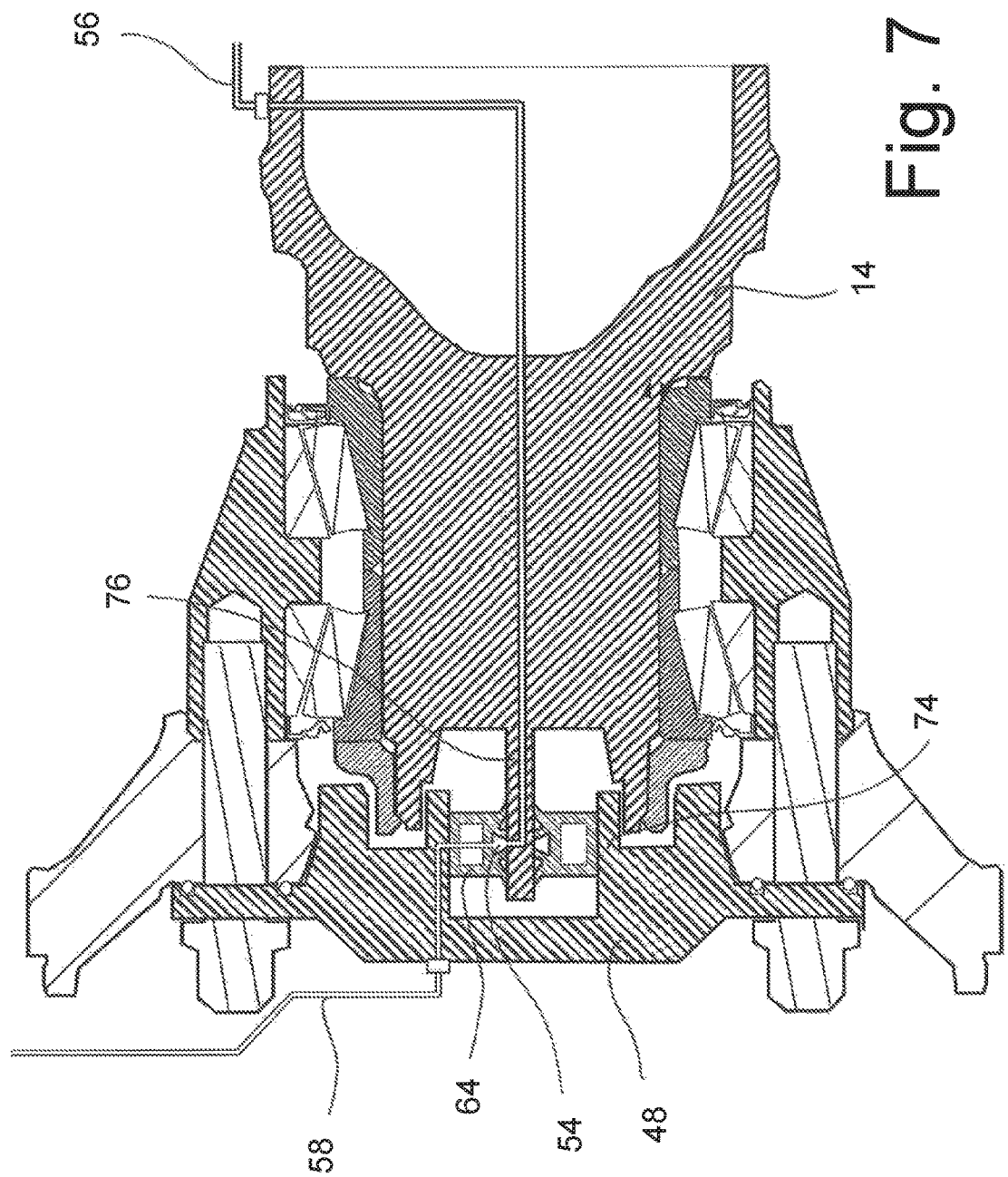
FIG. 7 shows an exemplary embodiment of the second vehicle axle assembly, in the case of which a hollow cylindrical projection of the cover surrounds a cylindrical end section of the axle body.

FIG. 7 shows a further exemplary embodiment in which the coupling, which is suitable for conducting pressure medium, is designed as per the second variant of the second vehicle axle assembly. Said example differs from the previous example in that the projection 74 formed on the axial inner side of the cover 48 is of hollow cylindrical form and surrounds a cylindrical end section 76 of the axle body 14 in the region of the axial overlap thereof. The ring-shaped chamber 54 is in this case produced by way of a shaft sealing ring 64 whose circumferential sealing lips are formed on the inner shell surface thereof. The shaft sealing ring 64 is sealingly arranged between the projection 74 and the end section 76, such that the ring-shaped chamber 54 is delimited between its inner shell surface, two of its circumferential sealing lips, and the outer shell surface of the end section 76. The first pressure medium line 56 extends into the ring-shaped chamber 54 and the second pressure medium line 58 extends out of the ring-shaped chamber 54 through shaft sealing ring 64 into the projection 74. In this example, too, the region of the ring-shaped chamber 54 with the shaft sealing ring 64 is, for space reasons, illustrated only in simplified form and not in accurate detail. A possible detailed embodiment of said region will be described in more detail further below on the basis of FIG. 13.

Figure 8:
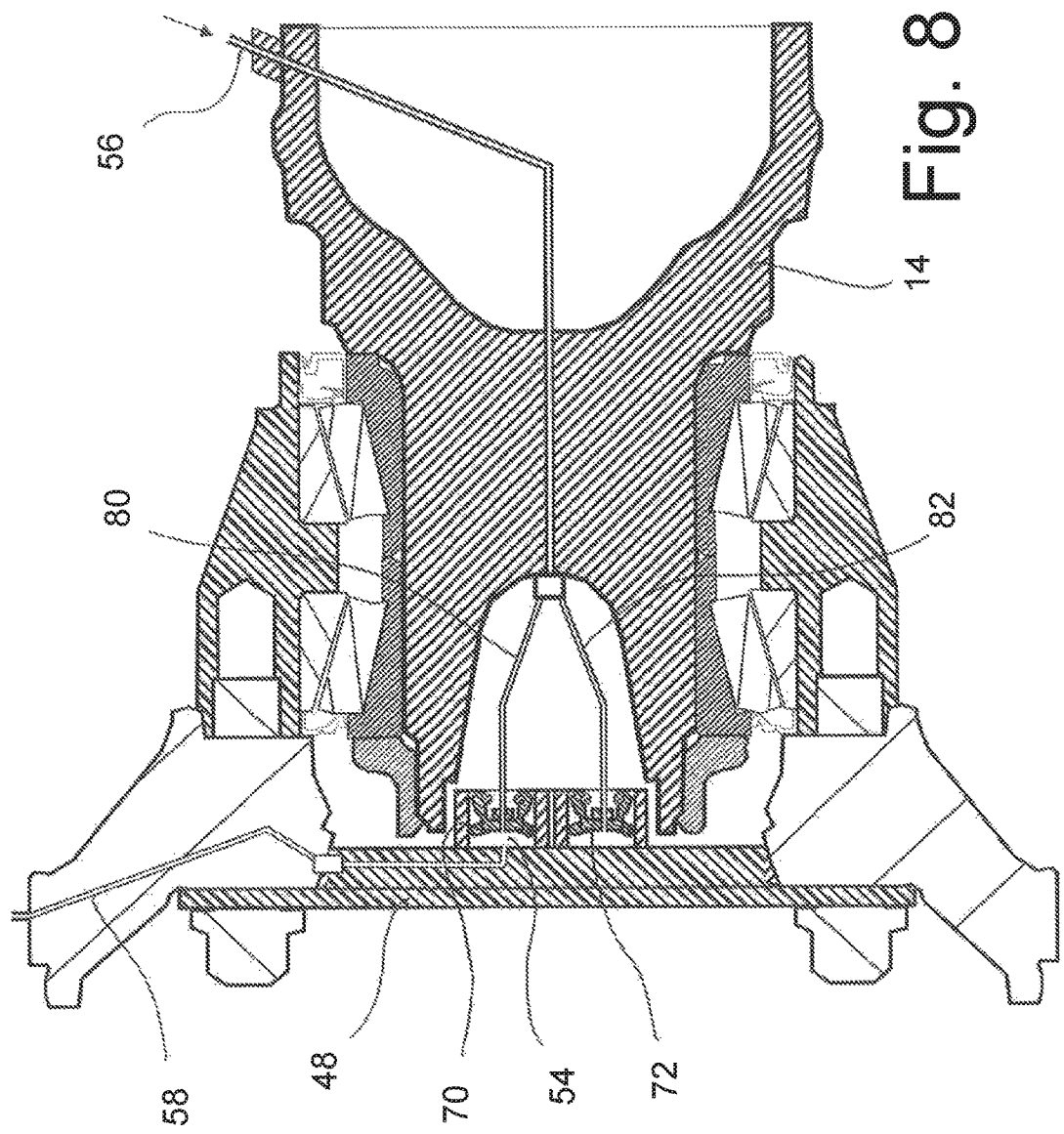
FIG. 8 shows an exemplary embodiment of the second vehicle axle assembly, in the case of which a ring-shaped profile with U-shaped cross section is formed on an axial inner side of the cover.

FIG. 8 shows an exemplary embodiment in which the coupling, which is suitable for conducting pressure medium, is designed as per the third variant of the second vehicle axle assembly. Said example differs from the example of FIG. 6 in that, in this case, the ring-shaped chamber 54 is delimited between the axially running side walls of a ring-shaped profile 70 of U-shaped cross section, which is connected to the axial inner side of the cover 48, and a sealing ring 72 which is non-rotatable with respect to the axle body 14. The first pressure medium line 56 splits, analogously to the example of FIG. 6, into two sub-lines 80 and 82 before it extends through the sealing ring 72 into the ring-shaped chamber 54. The second pressure medium line 58 extends out of the ring-shaped chamber 54 through the ring-shaped profile 70 and the cover 48. In this case, too, the region of the ring-shaped chamber 54 with the ring-shaped profile 70 and the sealing ring 72 is, for space reasons, illustrated only in simplified form and not in accurate detail. A possible detailed embodiment of said region will be described in more detail further below on the basis of FIG. 14.

Possible embodiments for the further guidance of the second pressure medium line 58 of the second vehicle axle assembly towards and up to the valve 42 on the wheel 36 will now be described on the basis of FIGS. 9 to 11.

Figure 9:
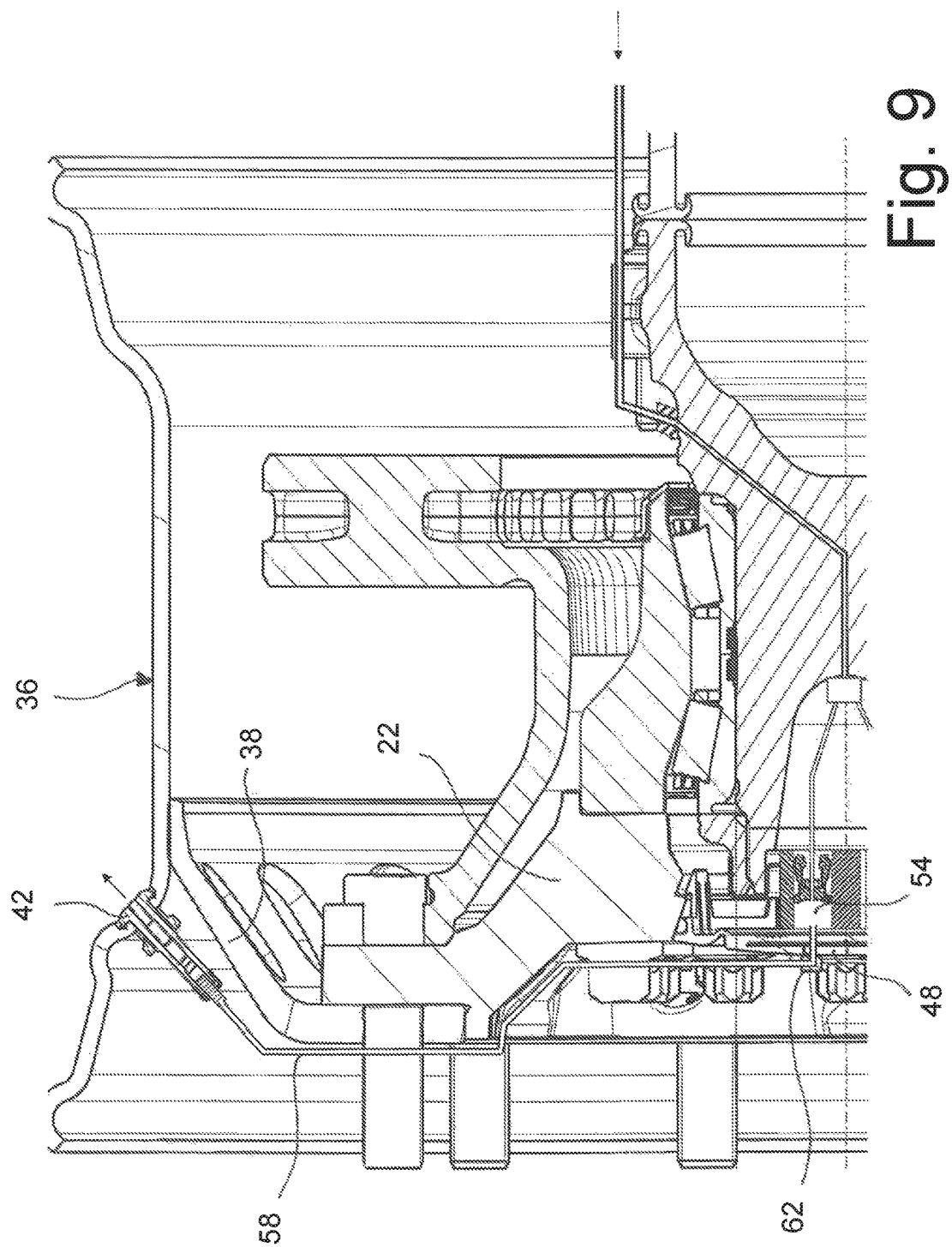
FIG. 9 shows an exemplary embodiment of the second vehicle axle assembly, in the case of which the second pressure medium line is led axially outside the flange.

In the embodiment of the second vehicle axle assembly shown in FIG. 9, the second pressure medium line 58 extends through the cover 48 from the ring-shaped chamber 54 in a substantially axial direction towards and up to a schematically illustrated pressure medium line connector 62 provided on the axial outer side of said cover. The second pressure medium line 58 may be led through the cover 48 by way of a bore formed therein. It is however self-evident that the cover 48 may also be produced as a casting with a corresponding line. From the pressure medium line connector 62, the second pressure medium line 58 extends, in its further profile, as a pipeline in a substantially radial direction along the axial outer side of the flange 22 and axially outside the wheel disk 38, and is finally connected to the valve 42 on the wheel 36. The pressure medium line connector 62 may advantageously be realized by way of a closure mechanism which is easy for a user to handle, possibly with a detent engagement function.

Figure 10:
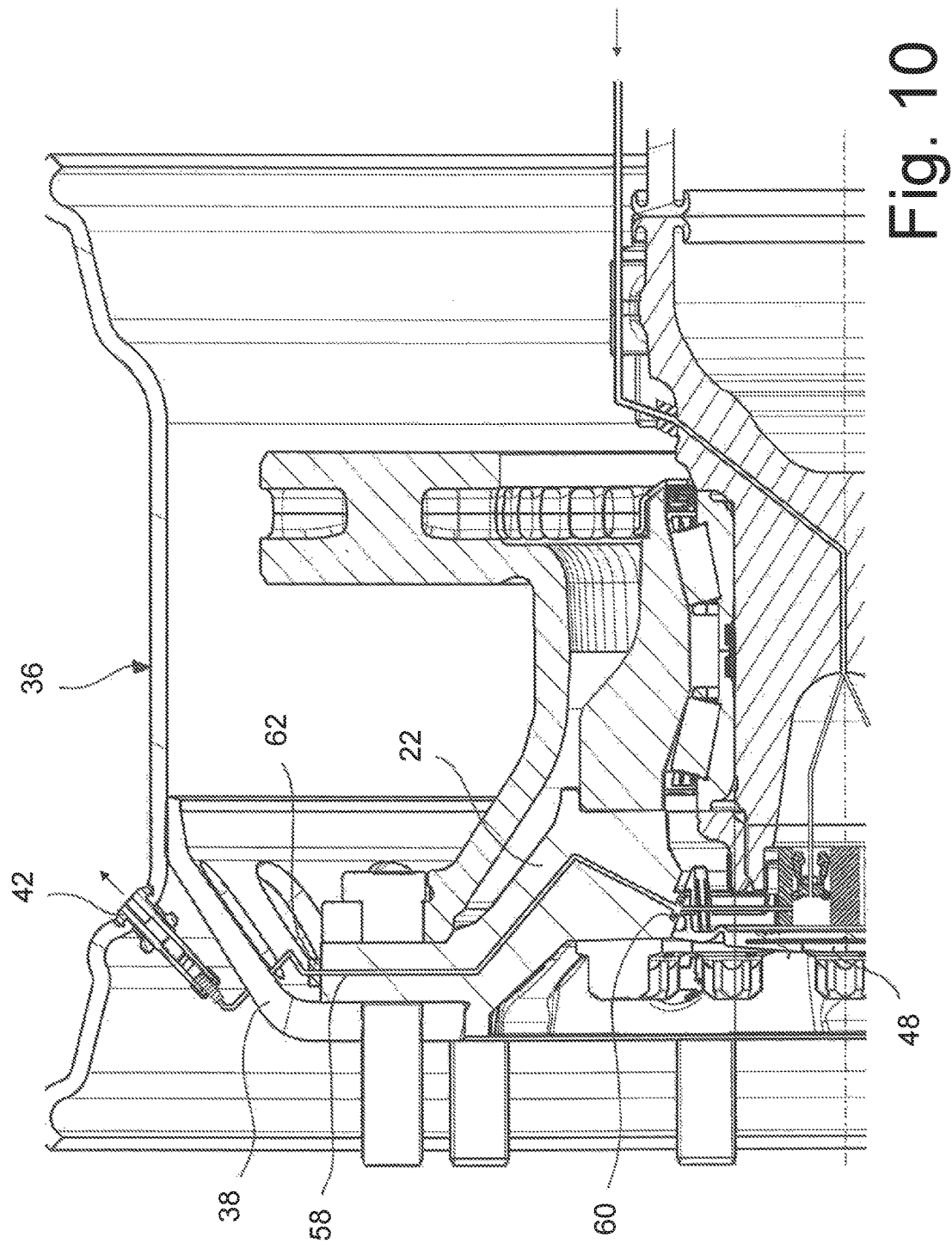
FIG. 10 shows an exemplary embodiment of the second vehicle axle assembly, in the case of which the second pressure medium line runs through the flange to the outer circumferential surface thereof.

FIG. 10 shows another exemplary embodiment of the second vehicle axle assembly. In contrast with the previous example, the second pressure medium line 58 in this case does not run up to a pressure medium line connector 62 which is provided on an axial outer side of the cover 48, but only to a pressure medium line connector 62 which is provided on an outer circumferential surface of the flange 22. The second pressure medium line 58 extends firstly through the cover 48 in a substantially radial direction towards and up to the outer circumferential surface thereof, and transitions from there into the flange 22. To ensure a pressure-tight transition of the second pressure medium line 58 between the cover 48 and the flange 22, a recess 60 is provided on that side of the flange 22 which bears against the outer circumferential side of the cover 48, in which recess there is arranged a sealing ring, for example an O-ring, which is compressed in the recess 60 during the mounting of the cover 48 on the flange 22 and seals off the second pressure medium line 58. The second pressure medium line 58 subsequently extends through the flange 22 in a substantially radial direction towards and up to a pressure medium line connector 62 which is provided on an outer circumferential surface of the flange 22. In the illustration of FIG. 10, said pressure medium line connector 62 on the outer circumferential surface of the flange 22 is merely schematically indicated. The second pressure medium line 58 may run through the cover 48 and through the flange 22 for example by way of bores formed into said components. It is however self-evident that the components may also be produced as castings with corresponding lines.

From the pressure medium line connector 62, the second pressure medium line 58 extends as a pipeline in a substantially radial direction and, in its profile, is firstly led axially within the wheel disk 38, subsequently extends through a passage hole 44 formed in the wheel disk 38, and thereafter runs axially outside the wheel disk 38 towards and up to the connection to the valve 42 provided on the wheel 36. An advantage of this variant is that the second pressure medium line 58 is led so as to be protected against external environmental influences over a major part of its length.

Figure 11:
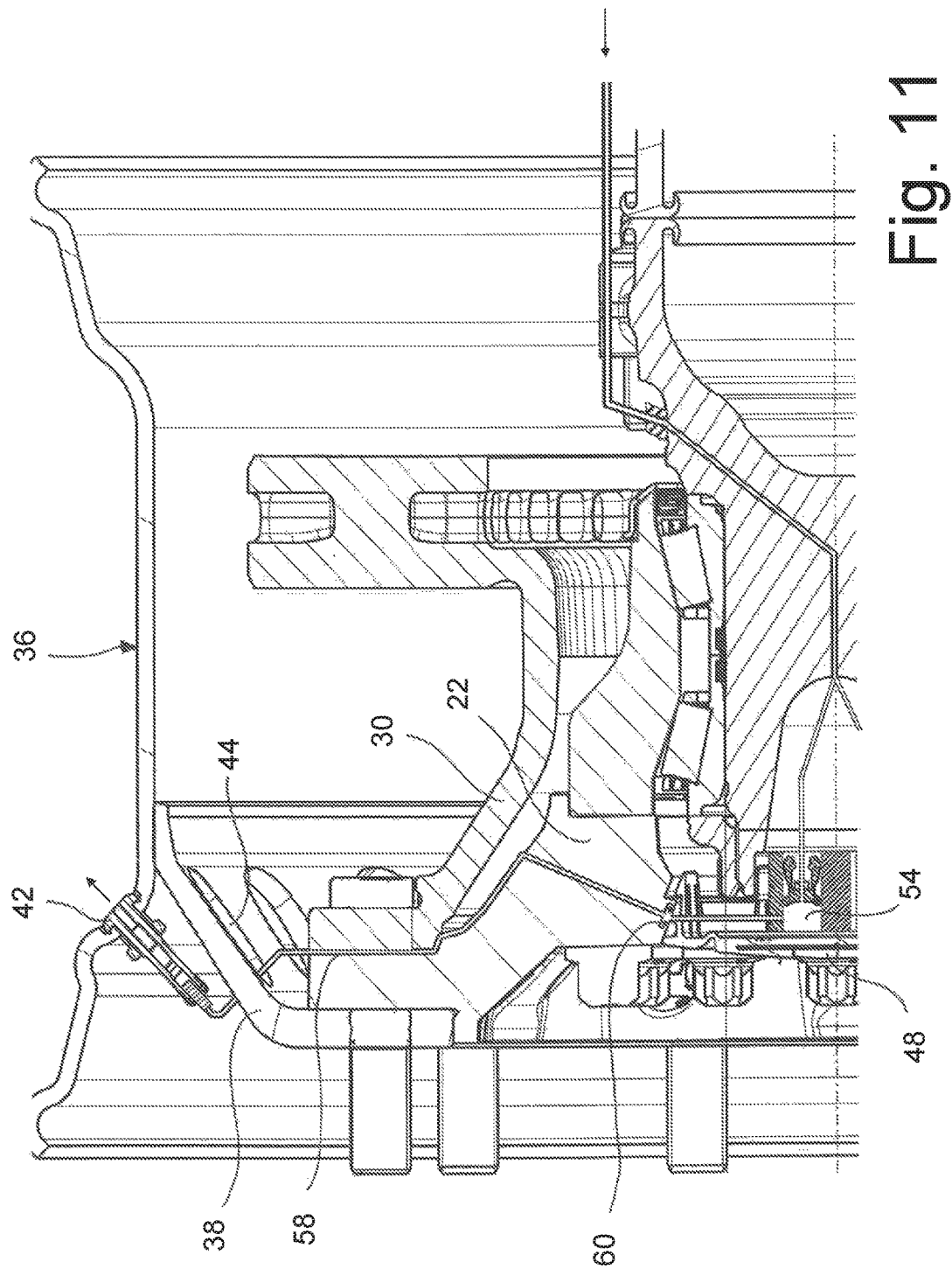
FIG. 11 shows an exemplary embodiment of the second vehicle axle assembly, in the case of which the second pressure medium line runs axially within the flange.

FIG. 11 shows a further exemplary embodiment of the second vehicle axle assembly. In the exemplary embodiment illustrated here, the second pressure medium line 58 extends from the ring-shaped chamber 54 towards and up to the flange 22 initially in the same way as in the preceding example. From the recess 60 provided at the transition between the cover 48 and the flange 22, the second pressure medium line 58 however now extends to the axial inner side of the flange 22, and runs from there as a pipeline along the axial inner side of the flange 22 towards and up to an outer circumferential surface of the flange 22. The second pressure medium line 58 may advantageously be arranged, over its partial length along the axial inner side of the flange 22, in a recess provided in the flange 22. The second pressure medium line 58 may for example be sunk over half of its circumference into the recess. In the region of the axial inner side of the flange 22, against which the bracket 30 of the brake disk 28 bears, a recess may additionally be formed on that surface of the bracket 30 which bears against the flange 22, such that the pressure medium line 58 is sunk half into the recess of the flange 22 and half into the recess of the bracket 30 and is thus fixed between these. Such an arrangement of the second pressure medium line 58 along the axial inner side of the flange 22 is particularly advantageous because said second pressure medium line can be easily located and installed, for example by being simply pressed into the recess, and is furthermore fixed in position owing to the guidance between the flange 22 and the bracket 30. Furthermore, in this embodiment, too, the second pressure medium line 58 is protected against external environmental influences over a major part of its length.

In the example shown, no pressure medium line connector is provided on the outer circumferential surface of the flange 22. Instead, the second pressure medium line 58 runs onward seamlessly in a radial direction through a passage bore 44 formed in the wheel disk 38 towards and up to the connection to the valve 42 on the wheel 36. It is self-evident that a suitable pressure medium line connector may also be provided on the outer circumferential surface of the flange 22.

A mixed form of the embodiments shown in FIGS. 9 and 11 is also conceivable, specifically if, as described with reference to FIG. 9, the second pressure medium line 58 initially runs axially outside the cover 48, but is then led onward axially outside the flange 22 not over the full distance but rather only up to a passage hole 46 (cf. FIG. 1) formed in the flange 22, through which passage hole the second pressure medium line 58 runs to the axial inner side of the flange 22. From there, said second pressure medium line may then extend onward towards and up to the valve 42 on the wheel 36 as described with reference to FIG. 11.

Figure 12:
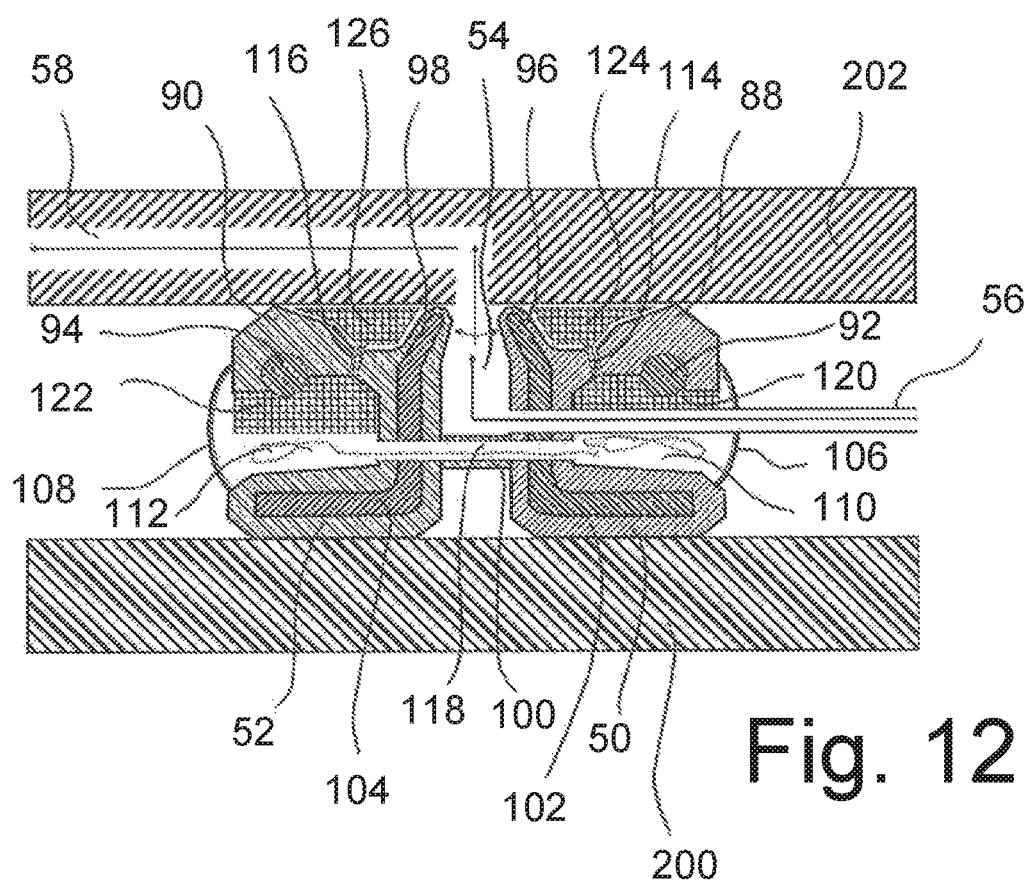
FIG. 12 shows a detail view of an exemplary embodiment of the first variant of the first and second vehicle axle assembly with a ring-shaped chamber delimited by two shaft sealing rings.
Figure 13:
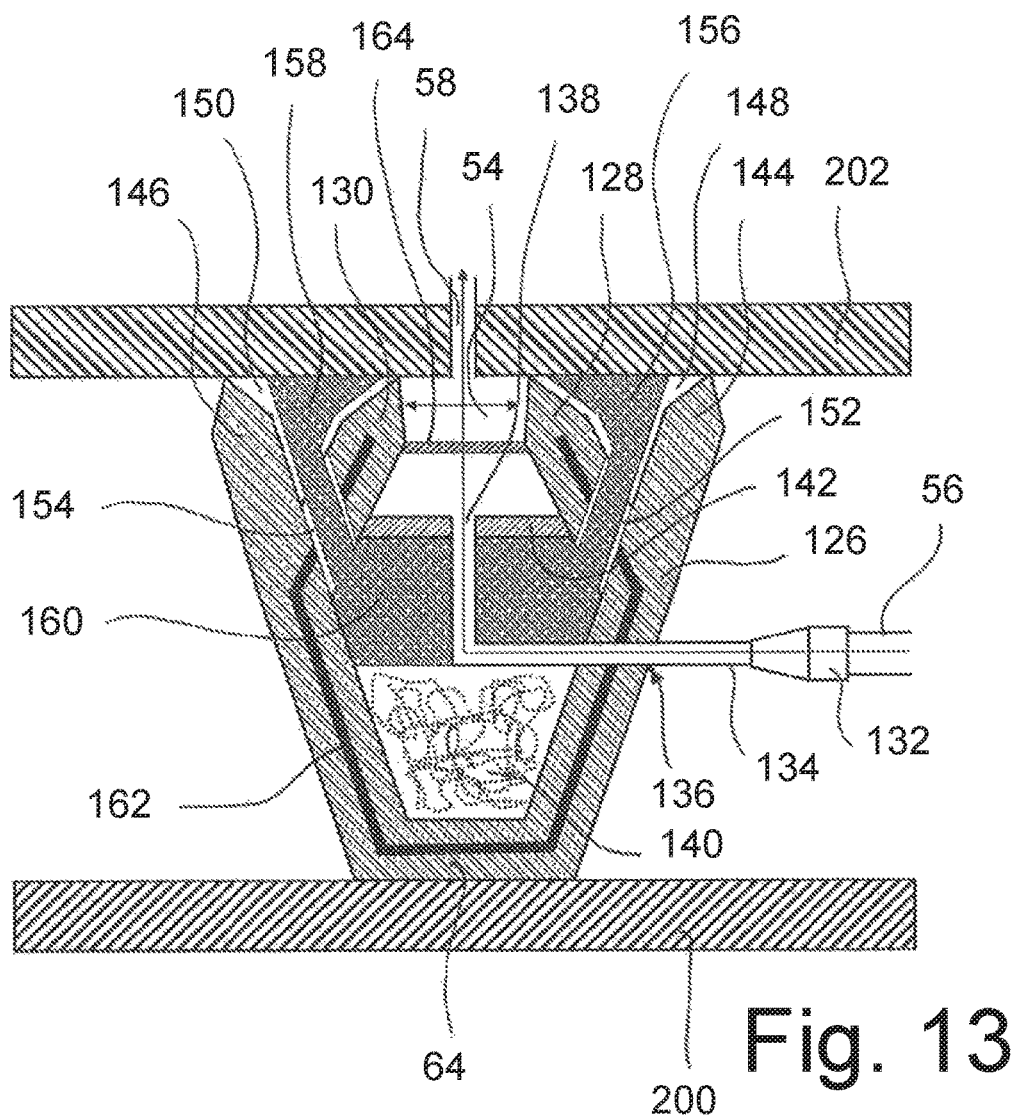
FIG. 13 shows a detail view of an exemplary embodiment of the second variant of the first and second vehicle axle assembly with a ring-shaped chamber formed between the circumferential sealing lips of a shaft sealing ring.
Figure 14:
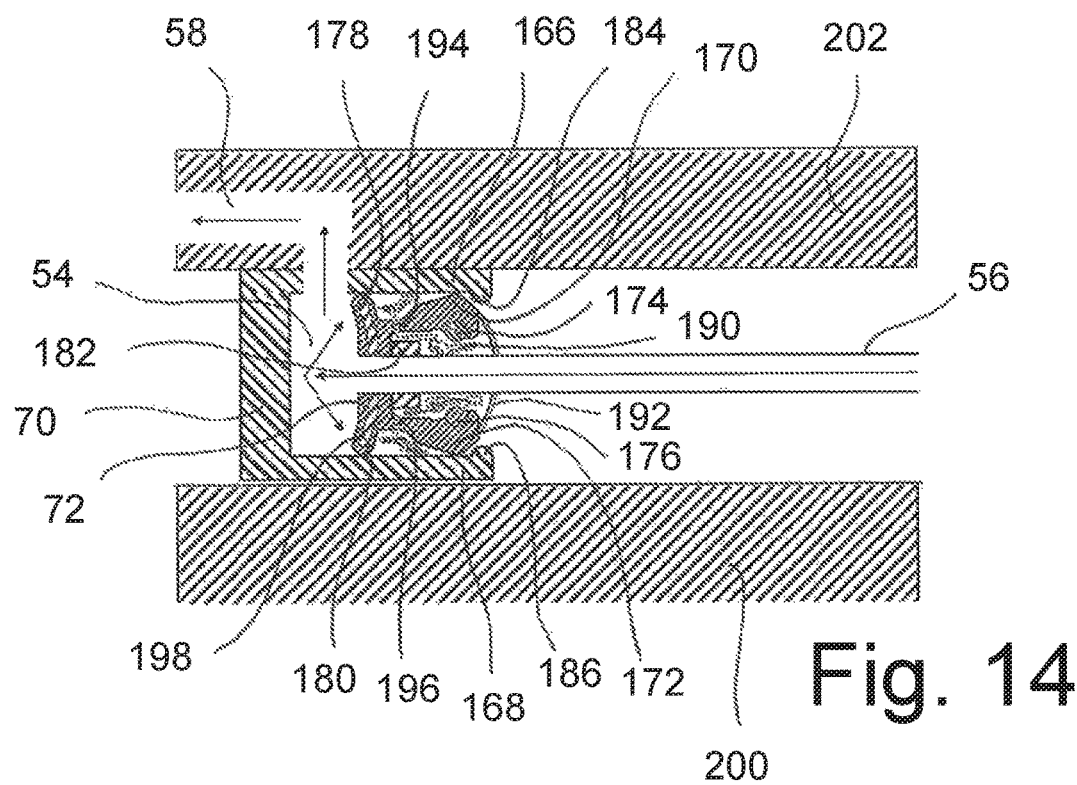
FIG. 14 shows a detail view of an exemplary embodiment of the third variant of the first and second vehicle axle assembly with a ring-shaped chamber formed by a sealing ring arranged in a ring-shaped profile with U-shaped cross section.

Finally, reference is made to FIGS. 12 to 14. Said figures show detail views of the respectively first, second and third variants of the first and second vehicle axle assembly, and illustrate possible detailed embodiments in the region of the ring-shaped chamber 54, which embodiments are illustrated merely in simplified form in FIGS. 2 to 11 for space reasons.

Since the following statements are applicable equally to the first and second vehicle axle assemblies, in order to avoid unnecessary repetitions, the common term "radially outer body 202" will be used below to refer to the outer race 20 of the first vehicle axle assembly and to the hollow cylindrical projection 74, which surrounds the end section, or to the hollow cylindrical end section 76, which surrounds the projection, of the second vehicle axle assembly. Analogously, the common term "radially inner body 200" will be used to refer to the inner race 18 of the first vehicle axle assembly and to the cylindrical projection 74, which is surrounded by the end section, or to the cylindrical end section 76, which is surrounded by the projection, of the second vehicle axle assembly.

FIG. 12 shows a possible exemplary embodiment in the region of the ring-shaped chamber 54 of the respectively first variant of the first and second vehicle axle assembly. In this exemplary embodiment, an axially inner shaft sealing ring 50 and an axially outer shaft sealing ring 52 are arranged between the radially inner body 200 and the radially outer body 202, which shaft sealing rings may be realized by commercially available shaft sealing rings, for example so-called Simmerrings®. A first pressure medium line 56 runs in the cavity between the radially inner body 200 and the radially outer body 202 and extends through the axially inner shaft sealing ring 50 in order to open into the ring-shaped chamber 54. A second pressure medium line 58 runs out of the ring-shaped chamber 54, which second pressure medium line is, at its end remote from the chamber, configured to be connected to a wheel.

Both shaft sealing rings 50 and 52 adhere, in each case radially at the inside, to the radially inner body 200 by frictional engagement, and are each equipped, radially at the outside, with a main sealing lip 88 and 90 respectively, which is pressed against the radially outer body 202 by way of a pressing force generated by a spiral-type expander 92 and 94 respectively and thus generates direct sealing between the radially inner body 200 and the radially outer body 202. In the event of rotation of the radially outer body 202 around the radially inner body 200, the two shaft sealing rings 50 and 52 co-rotate with the radially outer body 202 owing to said frictional engagement, such that the main sealing lips 88 and 90 slide over the inner shell surface of the radially outer body 202.

Both shaft sealing rings 50 and 52 are, radially at the outside and adjacent to the ring-shaped chamber 54, equipped with in each case one collar 96 and 98 respectively. The two collars 96 and 98 are, at least when a positive pressure prevails in the chamber 54, in sliding contact with the inner shell surface of the radially outer body 202. The two shaft sealing rings 50 and 52 are furthermore axially rigidly coupled to one another by way of a connecting element 100 which extends between the two shaft sealing rings 50 and 52 and which prevents an axial drifting-apart of the two shaft sealing rings 50 and 52 when a positive pressure prevails in the chamber 54. If the connecting element 100 extends continuously in the circumferential direction, it must have at least one opening in order that a pressure medium can pass through the chamber 54 from the first pressure medium line 56 to the second pressure medium line 58. The two shaft sealing rings 50 and 52 furthermore have in each case a core 102 and 104 respectively composed of a material which stiffens the shaft sealing rings 50 and 52. The cores 102 and 104 reinforce the shaft sealing rings 50 and 52 including the collars 96 and 98 thereof and stabilize these such that they can better withstand a positive pressure in the chamber 54 and do not fold over.

For the purposes of lubricant provision, those sides of the shaft sealing rings 50 and 52 which face away from the ring-shaped chamber 54 are equipped with covers 106 and 108 respectively by way of which the inner cavities 110 and 112 respectively of the two shaft sealing rings 50 and 52, which inner cavities are delimited by those legs of the shaft sealing rings 50 and 52 which extend substantially in the axial direction, are closed off to the outside. The dotted wavy lines in the illustration of FIG. 12 indicate that the cavities 110 and 112 are filled with a lubricant. In order that lubricant present in the cavities 110 and 112 can pass to the sealing surfaces of the shaft sealing rings 50 and 52 on the inner shell surface of the radially outer body 202, ducts 114 and 116 are provided which extend from the cavities 110 and 112 in a substantially radial direction through those limbs of the shaft sealing rings 50 and 52 which connect the collars 96 and 98 and the main sealing lips 88 and 90 of the shaft sealing rings 50 and 52 to one another. The cavities 110 and 112 thus serve as lubricant reservoirs which gradually release lubricant for the lubrication of the sealing surfaces of the shaft sealing rings 50 and 52. Furthermore, a line 118 is provided which connects the cavity 110 of the axially inner shaft sealing ring 50 to the cavity 112 of the axially outer shaft sealing ring 52. The line 108 runs through the connecting element 100 and permits a transportation of lubricant from one of the two cavities 110 and 112 into the respective other, such that the lubricant can be distributed between both cavities 110 and 112.

Furthermore, in the cavities 110 and 112, there are provided sponge-like materials, in this case foamed materials 120 and 122 respectively, which fill a part of the cavities 110 and 112 and cover inlet openings of the ducts 114 and 116. The foamed materials 120 and 122 ensure that lubricant situated in the cavities 110 and 112 does not flow off directly through the ducts 114 and 116 but rather is firstly absorbed by the foamed materials 120 and 122 and stored in order to then be gradually released into the ducts 114 and 116. Furthermore, sponge-like foamed materials 124 and 126 are provided in each case in the intermediate spaces between the collars 96 and 98 respectively and the main sealing lips 88 and 90 respectively. Lubricant that enters said intermediate spaces from the cavities 110 and 112 via the ducts 114 and 116 is absorbed by the foamed materials 124 and 126 and is subsequently distributed by these uniformly to the sealing surfaces of the shaft sealing rings 50 and 52 on the inner shell surface of the radially outer body 202.

FIG. 13 shows a possible exemplary embodiment in the region of the ring-shaped chamber 54 of the respectively second variant of the first and second vehicle axle assemblies. In this exemplary embodiment, a shaft sealing ring 64 is arranged between the radially inner body 200 and the radially outer body 202, the ring-shaped main body 126 of which shaft sealing ring has a sealing surface which is formed by the radially inner shell surface of the main body 126 and which runs in a circumferential direction and which bears areally against the radially inner body 200 in order to produce a force-fitting connection therewith. From the radially outer shell surface of the main body 126, two circumferential sealing lips 128 and 130 extend substantially radially outward and, between them, the radially outer shell surface of the main body 126 and the inner shell surface of the radially outer body 202 delimit the ring-shaped chamber 54. The circumferential sealing lips 128 and 130 each have, on their free end, sliding surfaces which are in sealing contact with the inner shell surface of the radially outer body 202.

A first pressure medium line 56 runs in the cavity between the radially inner body 200 and the radially outer body 202 and extends through the shaft sealing ring 64 in order to open into the ring-shaped chamber 54. More specifically, the first pressure medium line 56 is connected, by way of a connector 132, in pressure-tight and fluid-conducting fashion to a pipe-like line 134 which runs through a pressure medium inlet 136, provided in a lateral outer wall of the main body 126, of the shaft sealing ring 64. In the example shown, the line 134 runs into the main body 126 through the inlet 136 and protrudes outward beyond the main body 126. However, the connector 132 may also be situated directly at the inlet 136 and may for example be formed in the side wall of the main body 126. In the example shown, the line 134 leads through the main body 126 towards and up to a pressure medium outlet 138 provided on the outer shell surface of the main body 126, which pressure medium outlet opens into the ring-shaped chamber 54. A second pressure medium line 58 runs out of the ring-shaped chamber 54, which second pressure medium line is, at its end remote from the chamber, configured to be connected to a wheel.

The shaft sealing ring 64 has an inner cavity 140 which is separated from the ring-shaped chamber 54 in pressure-tight fashion by a partition 142 which forms the outer shell surface of the main body 126. The dotted wavy lines in the illustration of FIG. 13 indicate that the inner cavity 140 is filled with a lubricant. Furthermore, the shaft sealing ring 64 has, adjacent to the two circumferential sealing lips 128 and 130, in each case one additional, radially extending circumferential sealing lip 144 and 146 respectively. Ring-shaped intermediate spaces 148 and 150 are formed between the respectively adjacent circumferential sealing lips 128 and 144, and 130 and 146, respectively.

In order to be able to conduct lubricant that is present in the inner cavity 140 to the sliding surfaces of the circumferential sealing lips 128 and 130, and 144 and 146, respectively, lubricant ducts 152 and 154 are provided which extend from the inner cavity 140 in a substantially radial direction and which open into the intermediate spaces 148 and 150. The intermediate spaces 148 and 150 are almost completely filled with a sponge-like foamed material 156 and 158 respectively which has the effect that lubricant that has passed through the ducts 152 and 154 into the intermediate spaces 148 and 150 is initially absorbed and is subsequently distributed uniformly to the sliding surfaces of the circumferential sealing lips 128, 130, 144 and 146 on the inner shell surface of the radially outer body 202. Furthermore, in the inner cavity 140, there is provided a sponge-like foamed material 160 which fills a radially outer region of the inner cavity 140 and which covers the inlet openings of the lubricant ducts 152 and 154. The foamed material 160 ensures that lubricant that is situated in the inner cavity 140 does not flow off unhindered through the lubricant ducts 152 and 154, but rather is initially absorbed and stored by the foamed material 160 in order to then be released gradually into the lubricant ducts 152 and 154.

To improve its dimensional stability, the shaft sealing ring 64 has a core 162 which is embedded in its main body 126 and which is extended in particular until into the circumferential sealing lips 128 and 130. The core 162 thus not only stiffens the main body 126 but also stabilizes the circumferential sealing lips 128 and 130 such that they can better withstand a positive pressure in the chamber 54 and in particular cannot fold over laterally in an outward direction. Furthermore, in this example, the circumferential sealing lips 128 and 130 which delimit the ring-shaped chamber 54 are axially coupled to one another by a connecting element 164. The connecting element 164 ensures that the circumferential sealing lips 128 and 130 are held together when a positive pressure prevails in the chamber 54. The connecting element 164 may be continuous in a circumferential direction and must have at least one opening in order that pressure medium can pass out of the pressure medium line 56 into the pressure medium line 58 through the ring-shaped chamber 54.

FIG. 14 shows a possible exemplary embodiment in the region of the ring-shaped chamber 54 of the respectively third variant of the first and second vehicle axle assemblies. In this exemplary embodiment, the ring-shaped chamber 54 is delimited by a ring-shaped profile 70 of U-shaped cross section which is connected to the inner shell surface of the radially outer body 202, the side walls 166 and 168 of which ring-shaped profile run axially, and by a sealing ring 72 arranged between the side walls 166 and 168. The sealing ring 72 is non-rotatable with respect to the radially inner body 200. A first pressure medium line 56 is likewise non-rotatable with respect to the radially inner body 200 and extends through the sealing ring 72 in order to open into the ring-shaped chamber 54. A second pressure medium line 58 extends from the ring-shaped chamber 54 firstly through the ring-shaped profile 70 and subsequently through the radially outer body 202, in order to be connected, at its end remote from the chamber, to a wheel.

The sealing ring 70 is equipped, both radially at the inside and radially at the outside, with a main sealing lip 170 and 172, which is pressed against the side wall 166 and 168 respectively in each case by a pressing force generated by a spiral-type expander 174 and 176 respectively and thus generates sealing between the two side walls 166 and 168 respectively. In the event of a rotation of the radially outer body 202 around the radially inner body 200, the sealing ring 72 is fixed relative to the radially inner body 200, whereas the main sealing lips 170 and 172, which are in contact with the side walls 166 and 168, slide over the inner surfaces of the side walls 166 and 168. The sealing ring 72 is furthermore equipped, adjacent to the ring-shaped chamber 54 and both radially at the inside and radially at the outside, with a collar 178 and 180 respectively, which collars, at least when a positive pressure prevails in the ring-shaped chamber 54, are in contact with the inner surfaces of the side walls 166 and 168 respectively.

To counteract a situation in which the sealing ring 72 is pushed out of the side walls 166 and 168 of the ring-shaped profile 70 when a positive pressure prevails in the chamber 54, a bracket is provided which is realized as an abutment 182 on the first pressure medium line 56 close to the point at which the latter opens into the chamber 54. Furthermore, in the region of the open ends of the side walls 166 and 168 of the ring-shaped profile 70, there are provided, on the inner surfaces of the side walls 166 and 168, holding ribs 184 and 186 respectively which extend in a circumferential direction and which prevent an axial movement of the sealing ring 72 out of the ring-shaped profile 70 when the main sealing lips 170 and 172 respectively abut against the holding ribs 184 and 186 respectively.

The sealing ring 72 has an inner cavity 190 which is formed by the substantially axially extending limb of the sealing ring 72 and which serves as a lubricant reservoir. For this purpose, those sides of the sealing ring 72 which face away from the ring-shaped chamber are equipped with a cover 192 which closes off the cavity 190 to the outside. By way of the dotted wavy lines in the illustration of FIG. 14, it is indicated that the cavity 190 is filled with a lubricant. In order that lubricant present in the cavity 190 can pass to the sealing surfaces of the sealing ring 72 on the side walls 166 and 168 of the ring-shaped profile 70, ducts 194 and 196 respectively are provided which extend from the cavity 190 in a substantially radial direction through those limbs of the sealing ring 72 which connect the collars 178 and 180 respectively and the main sealing lips 170 and 172 respectively of the sealing ring 72 to one another. The cavity 190 thus serves as a lubricant reservoir which gradually releases, through the ducts 194 and 196, lubricant for the lubrication of the sealing surfaces of the sealing rings 72.

Finally, the sealing ring 72 has a core 198 composed of a material which stiffens the sealing ring 72. The core 198 reinforces the sealing ring 72 including the collars 178 and 180 thereof and stabilizes these such that they can better withstand a positive pressure in the chamber 54.

It is self-evident that the embodiments shown in FIGS. 12 to 14 in the region of the ring-shaped chamber 54 are to be understood merely as examples, and that numerous further embodiments of said region with the features described in the introduction are conceivable. For a more detailed description of such possible embodiments and of further possible embodiments in the region of the ring-shaped chamber 54, reference is made again to the international patent application with the application number PCT/EP2013/069599 and to the German patent application with the application number 10 2013 017 879.7.

The invention claimed is:

1. A vehicle axle assembly, comprising:
 a hub mounted on a cylindrical axle body by a bearing and rotatable about a central longitudinal axis, wherein the bearing has an inner race connected to the cylindrical axle body and has an outer race connected to the hub;
 an axially inner shaft sealing ring and an axially outer shaft sealing ring in contact with the two races and sealingly arranged between the two races in a region of one axial end of the bearing and which delimit a ring-shaped chamber between the two races;
 a first pressure medium line which extends through the inner race or one of the two shaft sealing rings and which opens into the ring-shaped chamber; and
 a second pressure medium line which extends from the ring-shaped chamber through the outer race and which is configured to be connected to a wheel fastened on the hub.

2. The vehicle axle assembly according to claim 1, wherein the hub comprises a flange configured for fastening of the wheel, wherein the flange is fastened to the outer race and the second pressure medium line extends through the outer race and the flange towards and up to a pressure medium line connector provided on the flange.

3. The vehicle axle assembly according to claim 2, wherein the pressure medium line connector is provided on at least one of an axial outer side of the flange or an outer circumferential surface of the flange.

4. The vehicle axle assembly according to claim 2, wherein the second pressure medium line is, from the pressure medium line connector up to a connection to the wheel, in the form of a pipeline or hose line.

5. The vehicle axle assembly according to claim 1, wherein the hub comprises a flange configured for fastening of the wheel, and the outer race comprises a bore for receiving a pressure medium line screw, wherein the pressure medium line screw is configured for fastening of the flange to the outer race, and the second pressure medium line extends through the outer race into the bore and runs through the pressure medium line screw towards and up to a pressure medium line connector which is provided on a head of the pressure medium line screw.

6. The vehicle axle assembly according to claim 5, wherein the flange is connected to the outer race by a plurality of screws that includes the pressure medium line screw and other screws, and the bore in which the pressure medium line screw is received is fluidly connected to bores in which the other screws are received.

7. The vehicle axle assembly according to claim 1, wherein the hub comprises a flange configured for fastening of the wheel, wherein the flange is fastened to the outer race and the second pressure medium line extends through the outer race, or along an outer shell surface thereof, towards and up to the flange and then extends along an axial inner side of the flange towards and up to an outer circumferential surface of the flange.

8. The vehicle axle assembly according to claim 7, wherein a recess is formed in at least one of along the outer shell surface of the outer race or along the axial inner side of the flange, wherein the second pressure medium line is arranged in the recess.

9. A vehicle axle assembly, comprising:
 a hub mounted on a cylindrical axle body by a bearing and rotatable about a central longitudinal axis, wherein the bearing has an inner race connected to the cylindrical axle body and has an outer race connected to the hub;
 a shaft sealing ring with at least two radially extending circumferential sealing lips, the shaft sealing ring in contact with the two races and sealingly arranged between the two races in a region of one axial end of the bearing and delimiting a ring-shaped chamber between the circumferential sealing lips and one of the two races;
 a first pressure medium line which extends through at least one of the inner race or the shaft sealing ring and which opens into the ring-shaped chamber; and
 a second pressure medium line which extends from the ring-shaped chamber through at least one of the shaft sealing ring or the outer race and which is configured to be connected to a wheel fastened on the hub.

10. The vehicle axle assembly according to claim 9, wherein the hub comprises a flange configured for fastening of the wheel, wherein the flange is fastened to the outer race and the second pressure medium line extends through the outer race and the flange towards and up to a pressure medium line connector provided on the flange.

11. The vehicle axle assembly according to claim 10, wherein the pressure medium line connector is provided on at least one of an axial outer side of the flange or an outer circumferential surface of the flange.

12. The vehicle axle assembly according to claim 10, wherein the second pressure medium line is, from the pressure medium line connector up to a connection to the wheel, in the form of a pipeline or hose line.

13. The vehicle axle assembly according to claim 9, wherein the hub comprises a flange configured for fastening of the wheel, and the outer race comprises a bore for receiving a pressure medium line screw, wherein the pressure medium line screw is configured for fastening of the flange to the outer race, and the second pressure medium line extends through the outer race into the bore and runs through the pressure medium line screw towards and up to a pressure medium line connector which is provided on a head of the pressure medium line screw.

14. The vehicle axle assembly according to claim 13, wherein the flange is connected to the outer race by a plurality of screws that includes the pressure medium line screw and other screws, and the bore in which the pressure medium line screw is received is fluidly connected to bores in which the other screws are received.

15. The vehicle axle assembly according to claim 9, wherein the hub comprises a flange configured for fastening of the wheel, wherein the flange is fastened to the outer race and the second pressure medium line extends through the outer race, or along an outer shell surface thereof, towards and up to the flange and then extends along an axial inner side of the flange towards and up to an outer circumferential surface of the flange.

16. The vehicle axle assembly according to claim 15, wherein a recess is formed in at least one of along the outer shell surface of the outer race or along the axial inner side of the flange, wherein the second pressure medium line is arranged in the recess.

17. A vehicle axle assembly, comprising:
a hub mounted on a cylindrical axle body by a bearing and rotatable about a central longitudinal axis, wherein the bearing has an inner race connected to the cylindrical axle body and has an outer race connected to the hub;
a ring-shaped profile of U-shaped cross section connected to an inner shell surface of the outer race and side walls of which run axially or radially;
a sealing ring in contact with the two races and arranged between the side walls and non-rotatable with respect to the inner race in a region of one axial end of the bearing, the sealing ring delimiting a ring-shaped chamber in the ring-shaped profile;
a first pressure medium line which extends through the sealing ring and which opens into the ring-shaped chamber; and
a second pressure medium line which extends from the ring-shaped chamber through the ring-shaped profile and the outer race and which is configured to be connected to a wheel fastened on the hub.

18. The vehicle axle assembly according to claim 17, wherein the hub comprises a flange configured for fastening of the wheel, wherein the flange is fastened to the outer race and the second pressure medium line extends through the outer race and the flange towards and up to a pressure medium line connector provided on the flange.

19. The vehicle axle assembly according to claim 18, wherein the pressure medium line connector is provided on at least one of an axial outer side of the flange or an outer circumferential surface of the flange.

20. The vehicle axle assembly according to claim 18, wherein the second pressure medium line is, from the pressure medium line connector up to a connection to the wheel, in the form of a pipeline or hose line.

21. The vehicle axle assembly according to claim 17, wherein the hub comprises a flange configured for fastening of the wheel, and the outer race comprises a bore for receiving a pressure medium line screw, wherein the pressure medium line screw is configured for fastening of the flange to the outer race, and the second pressure medium line extends through the outer race into the bore and runs through the pressure medium line screw towards and up to a pressure medium line connector which is provided on a head of the pressure medium line screw.

22. The vehicle axle assembly according to claim 21, wherein the flange is connected to the outer race by a plurality of screws that includes the pressure medium line screw and other screws, and the bore in which the pressure medium line screw is received is fluidly connected to bores in which the other screws are received.

23. The vehicle axle assembly according to claim 17, wherein the hub comprises a flange configured for fastening of the wheel, wherein the flange is fastened to the outer race and the second pressure medium line extends through the outer race, or along an outer shell surface thereof, towards and up to the flange and then extends along an axial inner side of the flange towards and up to an outer circumferential surface of the flange.

24. The vehicle axle assembly according to claim 23, wherein a recess is formed in at least one of along the outer shell surface of the outer race or along the axial inner side of the flange, wherein the second pressure medium line is arranged in the recess.

25. The vehicle axle assembly according to claim 1, wherein the first pressure medium line is external to the hub.

26. The vehicle axle assembly according to claim 9, wherein the first pressure medium line is external to the hub.

27. The vehicle axle assembly according to claim 17, wherein the first pressure medium line is external to the hub.

* * * * *